US012632039B2

(12) United States Patent
Okimoto et al.

(10) Patent No.: US 12,632,039 B2
(45) Date of Patent: May 19, 2026

(54) DATA ANALYSIS DEVICE AND METHOD

(71) Applicant: Panasonic Intellectual Property Management Co., Ltd., Osaka (JP)

(72) Inventors: Yoshiyuki Okimoto, Nara (JP); Daijiroh Ichimura, Hyogo (JP); Akira Minegishi, Osaka (JP); Yosuke Tajika, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 766 days.

(21) Appl. No.: 17/990,669

(22) Filed: Nov. 19, 2022

(65) Prior Publication Data

US 2023/0083876 A1     Mar. 16, 2023

Related U.S. Application Data

(63) Continuation of application No. PCT/JP2020/043658, filed on Nov. 24, 2020.

(30) Foreign Application Priority Data

May 27, 2020     (JP) ................................. 2020-092464

(51) Int. Cl.
G05B 19/418 (2006.01)
G06Q 50/04 (2012.01)
(52) U.S. Cl.
CPC ........... G05B 19/418 (2013.01); G06Q 50/04 (2013.01)
(58) Field of Classification Search
CPC ........... G05B 23/0289; G05B 23/0272; G05B 23/0262
See application file for complete search history.

(56) References Cited

U.S. PATENT DOCUMENTS

2011/0093226 A1*   4/2011   Chieh-Chu ....... H01L 21/67271
                                                       702/82

FOREIGN PATENT DOCUMENTS

| EP | 3451092 A1 | 3/2019 |
|----|------------|--------|
| JP | 2007122639 A | 5/2007 |

(Continued)

OTHER PUBLICATIONS

Office Action for corresponding Japanese Application No. 2022-527483 issued Jun. 25, 2024 and its English machine translation.

(Continued)

*Primary Examiner* — Charles R Kasenge
(74) *Attorney, Agent, or Firm* — Renner, Otto, Boisselle & Sklar, LLP

(57)     ABSTRACT

A data analysis device, for analyzing efficiency of an assembly line operation including processes, includes: an input interface configured to acquire log data indicating a history of the processes respectively performed for each time of the assembly line operation; and a control circuit configured to generate analysis information indicating an analysis result of the history indicated by the log data, based on information generated by a probability model to calculate probability distribution for the assembly line operation. The probability model is configured to: generate process efficiency distribution indicating probability distribution of efficiency for each process in the assembly line operation, and variation factor distribution indicating probability distribution of a factor probable to vary the efficiency of the assembly line operation in each process; and generate work efficiency distribution indicating probability distribution of the efficiency of the assembly line operation, based on the process efficiency distribution and the variation factor distribution.

12 Claims, 12 Drawing Sheets

(56)     References Cited

FOREIGN PATENT DOCUMENTS

| | | | |
|---|---|---|---|
| JP | 2012-252662 | A | 12/2012 |
| JP | 2017-167599 | A | 9/2017 |
| JP | 2020-027470 | A | 2/2020 |
| WO | 2019013196 | A1 | 1/2019 |

OTHER PUBLICATIONS

International Search Report for corresponding Application No. PCT/JP2020/043658, mailed Jan. 12, 2021.

First Office Action for corresponding Chinese Application No. 202080101211.8 issued May 30, 2025 and its English Machine Translation.

Extended European Search Report for corresponding European Application No. 20937406.5 issued Nov. 14, 2023.

International Preliminary Report on Patentability for corresponding Application No. PCT/JP2020/043658 dated Nov. 17, 2022.

* cited by examiner

FACILITY LOG DATA

D11

| MANUFAC- TURED PRODUCT No. | LOT No. | LINE No. | FACILITY NAME | STR. PAR- AMETER s | STR. PAR- AMETER I | START TIME | END TIME | STOP TIME | MANUFAC- TURED PRODUCTS | NON- DEFECTIVE PRODUCTS |
|---|---|---|---|---|---|---|---|---|---|---|
| PN00003 | LOT003 | S-1 | EQP008 | TypeB | 4 | 11/21 07:23:32 | 11/21 08:24:37 | 32:46 | 750 | 750 |
| PN00003 | LOT003 | S-1 | EQP009 | TypeB | 4 | 11/21 07:24:00 | 11/21 08:26:35 | 35:32 | 750 | 750 |
| PN00003 | LOT003 | S-1 | EQP010 | TypeB | 4 | 11/21 07:24:34 | 11/21 08:28:30 | 29:48 | 750 | 749 |
| PN00003 | LOT003 | S-1 | EQP011 | TypeB | 4 | 11/21 07:25:15 | 11/21 08:31:02 | 45:23 | 749 | 749 |
| ... | ... | ... | ... | ... | ... | ... | ... | ... | ... | ... |

D12

| LOT No. | FACILITY NAME | ERROR CODE | STOP TIME | NUMBER OF STOPS |
|---|---|---|---|---|
| LOT033 | EQP014 | 156: | 13.2 | 1 |
| LOT033 | EQP015 | 069: | 406.7 | 5 |
| LOT033 | EQP015 | 031. | 18.6 | 1 |
| LOT033 | EQP015 | 147: | 15.2 | 1 |
| LOT033 | EQP015 | 223: | 178.8 | 1 |
| ... | ... | ... | ... | ... |

ERROR OBSERVATION

*FIG. 8*

| MODEL DATA | | | | | |
|---|---|---|---|---|---|
| MODEL PARAMETER [COMPONENT] | SAMPLE GROUP (M SAMPLES FOR EACH GROUP) | | | | |
| ws[1] | 0.079437 | 0.078889 | 0.079706 | 0.080091 | ⋮ |
| ws[2] | 0.084625 | 0.086650 | 0.086286 | 0.085570 | ⋮ |
| ws[3] | 0.072075 | 0.069873 | 0.069764 | 0.072929 | ⋮ |
| ws[4] | 0.074563 | 0.075258 | 0.077012 | 0.075678 | ⋮ |
| ws[5] | 0.078797 | 0.078523 | 0.078214 | 0.078161 | ⋮ |
| ws[6] | 0.084641 | 0.083833 | 0.083844 | 0.083091 | ⋮ |
| wl[1] | 0.544532 | 0.545921 | 0.546158 | 0.543546 | ⋮ |
| wl[2] | 0.580754 | 0.581699 | 0.581188 | 0.581412 | ⋮ |
| wl[3] | 0.744410 | 0.744462 | 0.744071 | 0.745027 | ⋮ |
| wl[4] | 0.900497 | 0.902605 | 0.901321 | 0.901988 | ⋮ |
| wl[5] | 1.046438 | 1.045540 | 1.046858 | 1.046385 | ⋮ |
| ⋯ | ⋯ | ⋯ | ⋯ | ⋯ | ⋯ |

FACTOR EVALUATION LIST ⟋D5

| LOT No. | FACILITY | ERROR CODE | STOP TIME | NUMBER OF STOPS | INFLUENCE DEGREE |
|---|---|---|---|---|---|
| LOT033 | EQP015 | 223: | 178.8 | 1 | 11.2 |
| LOT033 | EQP072 | 168: | 9.1 | 3 | 7.6 |
| LOT033 | EQP015 | 031: | 18.6 | 1 | 5.2 |
| LOT033 | EQP014 | 156: | 13.2 | 1 | 4.3 |
| LOT033 | EQP073 | 159: | 3.5 | 1 | 4.3 |
| LOT033 | EQP015 | 147: | 15.2 | 1 | 4.3 |
| LOT033 | EQP072 | 033: | 132.1 | 1 | 3.4 |
| LOT033 | EQP015 | 069: | 406.7 | 5 | 2.4 |

Figures 12A, 12B:
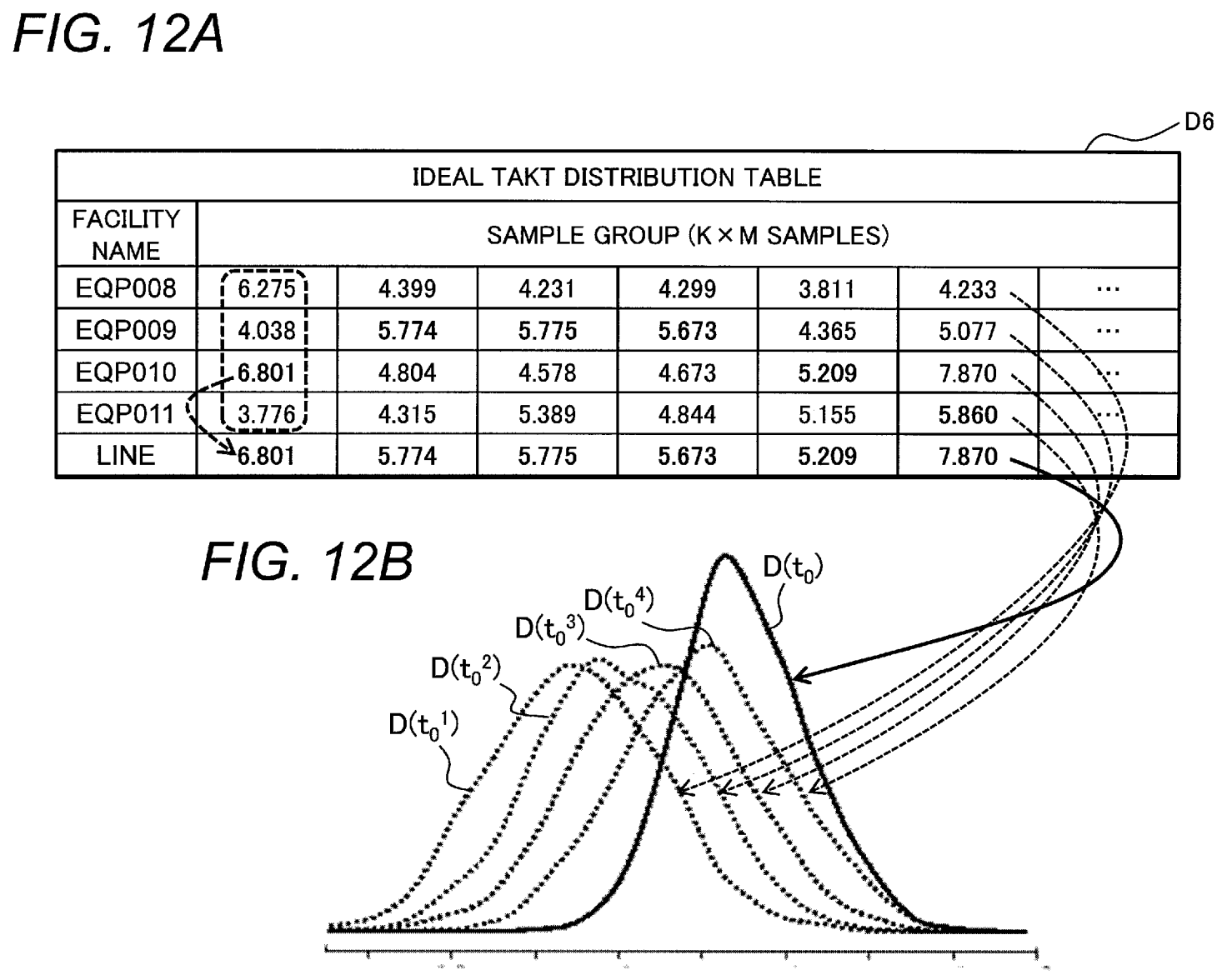

IDEAL TAKT DISTRIBUTION TABLE

| FACILITY NAME | SAMPLE GROUP (K × M SAMPLES) | | | | | | | |
|---|---|---|---|---|---|---|---|---|
| EQP008 | 6.275 | 4.399 | 4.231 | 4.299 | 3.811 | 4.233 | ⋮ |
| EQP009 | 4.038 | 5.774 | 5.775 | 5.673 | 4.365 | 5.077 | ⋮ |
| EQP010 | 6.801 | 4.804 | 4.578 | 4.673 | 5.209 | 7.870 | ⋮ |
| EQP011 | 3.776 | 4.315 | 5.389 | 4.844 | 5.155 | 5.860 | ⋮ |
| LINE | 6.801 | 5.774 | 5.775 | 5.673 | 5.209 | 7.870 | |

DATA ANALYSIS DEVICE AND METHOD

CROSS-REFERENCE TO RELATED APPLICATIONS

This is a continuation application of International Application No. PCT/JP2020/043658, with an international filing date of Nov. 24, 2020, which claims priority of Japanese Patent Application No. 2020-092464 filed on May 27, 2020, the content of which is incorporated herein by reference.

BACKGROUND

1. Technical Field

The present disclosure relates to a data analysis device and method for analyzing efficiency of operation in an assembly line.

2. Related Art

JP 2012-252662 A discloses a management device of a production line. The management device of a production line calculates metering device loss time on the basis of operation information recorded in an operation log, an error log, or the like of a packaging device in a production line for weighing and packaging an article. The metering device loss time is an amount of time lost due to lowering in the ability of the packaging device to package an article due to a delay in operation of the metering device out of the time originally spent by the packaging device to package an article. That is, the metering device loss time is a factor of a decrease in an operation rate of a production line. An object of the management device of a production line is to enable a manager of a production line to easily identify a factor of a decrease in an operation rate of a production line.

SUMMARY

The present disclosure provides a data analysis device and a data analysis method capable of facilitating to analyze variation in efficiency of an assembly line operation with a plurality of processes.

A data analysis device in the present disclosure is for analyzing efficiency of an assembly line operation including a plurality of processes. The data analysis device includes: an input interface configured to acquire log data indicating a history of the processes respectively performed for each time of the assembly line operation; and a control circuit configured to generate analysis information, based on information generated by a probability model to calculate probability distribution with respect to the assembly line operation, the analysis information indicating an analysis result of the history indicated by the log data. The probability model is configured to: generate process efficiency distribution and variation factor distribution, the process efficiency distribution indicating probability distribution of corresponding efficiency to each process in the assembly line operation, and the variation factor distribution indicating probability distribution of a factor in each process wherein the factor is probable to vary the efficiency of the assembly line operation; and generate work efficiency distribution, based on the process efficiency distribution and the variation factor distribution, the work efficiency distribution indicating probability distribution of the efficiency of the assembly line operation.

These general and specific aspects may be realized by a system, a method, and a computer program, and a combination of these.

According to the data analysis device and method in the present disclosure, it is possible to facilitate to analyze variation in efficiency of the assembly line operation with the plurality of processes.

BRIEF DESCRIPTION OF DRAWINGS

FIG. 3 is a diagram illustrating an example of a data structure of facility log data in the data analysis device.

FIG. 8 is a diagram illustrating a data structure of model data in the data analysis device.

FIG. 11 is a diagram illustrating an example of a factor evaluation list in the data analysis operation.

FIGS. 12A and 12B are diagrams for explaining details of processing in the data analysis operation.

DESCRIPTION OF EMBODIMENTS

Hereinafter, an embodiment will be described in detail with reference to the drawings as appropriate. However, description that is detailed more than necessary may be omitted. For example, detailed description of an already well-known matter and redundant description of substantially the same configuration may be omitted. This is to avoid unnecessary redundancy in the description below and to facilitate understanding of those skilled in the art.

Note that the applicant provides the accompanying drawings and the description below so that those skilled in the art can fully understand the present disclosure, and do not intend to limit the subject matter described in claims by these drawings and description.

First Embodiment

Hereinafter, a first embodiment of the present disclosure will be described with reference to the drawings.

1. Configuration 1-1. Outline

Figure 1:
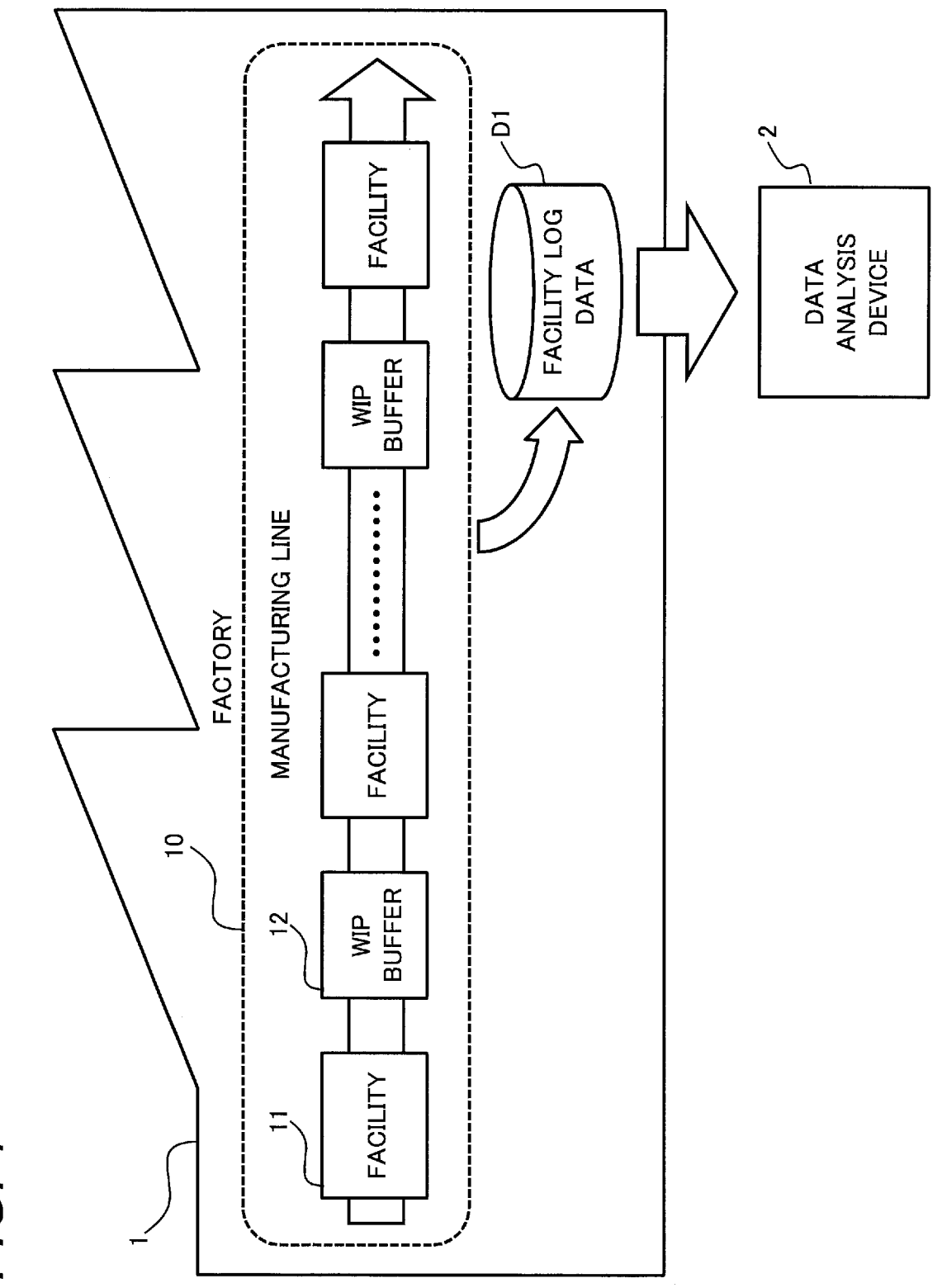
FIG. 1 is a diagram for explaining an outline of a data analysis device according to a first embodiment of the present disclosure.

FIG. 1 is a diagram for explaining an outline of a data analysis device 2 according to the present embodiment. For example, the data analysis device 2 of the present embodiment is applied to data management of performance for producing various manufactured products in an assembly line operation operating various facilities 11 included in a manufacturing line 10 of a factory 1. For example, data such as time during which each of the facilities 11 operates in the manufacturing line 10 and a situation in which an error occurs is collected and accumulated as facility log data D1 at the operation of the factory 1.

For example, the manufacturing line 10 illustrated in FIG. 1 includes a plurality of n of the facilities 11, which corresponds to each process in a series of processes from a first process to an n-th process of manufacturing a manufactured product, and a work-in-process buffer 12 that stores a manufactured product before completion (i.e., a work in process) between the facilities 11 of consecutive processes. The facilities 11 include various mechanical facilities for performing a corresponding process respectively. The work-in-process buffer 12 is a storage space having an allowable amount that is an amount of works in process that is capable of storing therein.

In the factory 1, when fault that lowers the production performance occurs, it is required that the occurrence of the fault is flexibly detected to specify the cause of the fault, in view of maintaining production performance of the manufacturing line 10 so as to constantly produce manufactured products. The manufacturing line 10 may fall into a situation in which stopping of the facility 11 in one process leads to waiting of the facility 11 in another process. The conventional data management is difficult to realize data analysis for analyzing which factor of which of the facilities 11 among all processes of the manufacturing line 10 causes fault of performance deterioration in the manufacturing line 10.

For example, it is considered that lowering in production performance in the manufacturing line 10 corresponds to increase of takt time that is time during which manufactured products of a unit quantity (e.g., one) are obtained for producing manufactured products of one lot or the like. However, the takt time also increases in a case where a facility with low performance is usually used and another case where a process with high difficulty in manufacturing is performed, and such cases are not fault of performance deterioration. The data analysis device 2 of the present embodiment realizes data analysis for detecting fault of the manufacturing line 10 separately from such cases.

For example, a factor of fault of the facility 11 may be operation stop due to various kinds of errors in each of the facilities 11. Here, when an error occurring frequently on a usual basis also occurs at the time of fault in the same manner as usual, it is expected that the influence of the error on the performance deterioration is relatively smaller. In contrast, when an error not occurring so usually occurs at the time of fault, it is expected that the influence of the error is larger, having higher possibility to be a factor of fault. Furthermore, among various processes of the manufacturing line 10, the influence of an error in a process close to a bottleneck is expected to be large. To reflect such influence, the data analysis device 2 of the present embodiment implements data analysis for evaluating the degree of how much a factor is expected to be a cause of fault for each of various factors.

1-2. Configuration of Data Analysis Device

Figure 2:
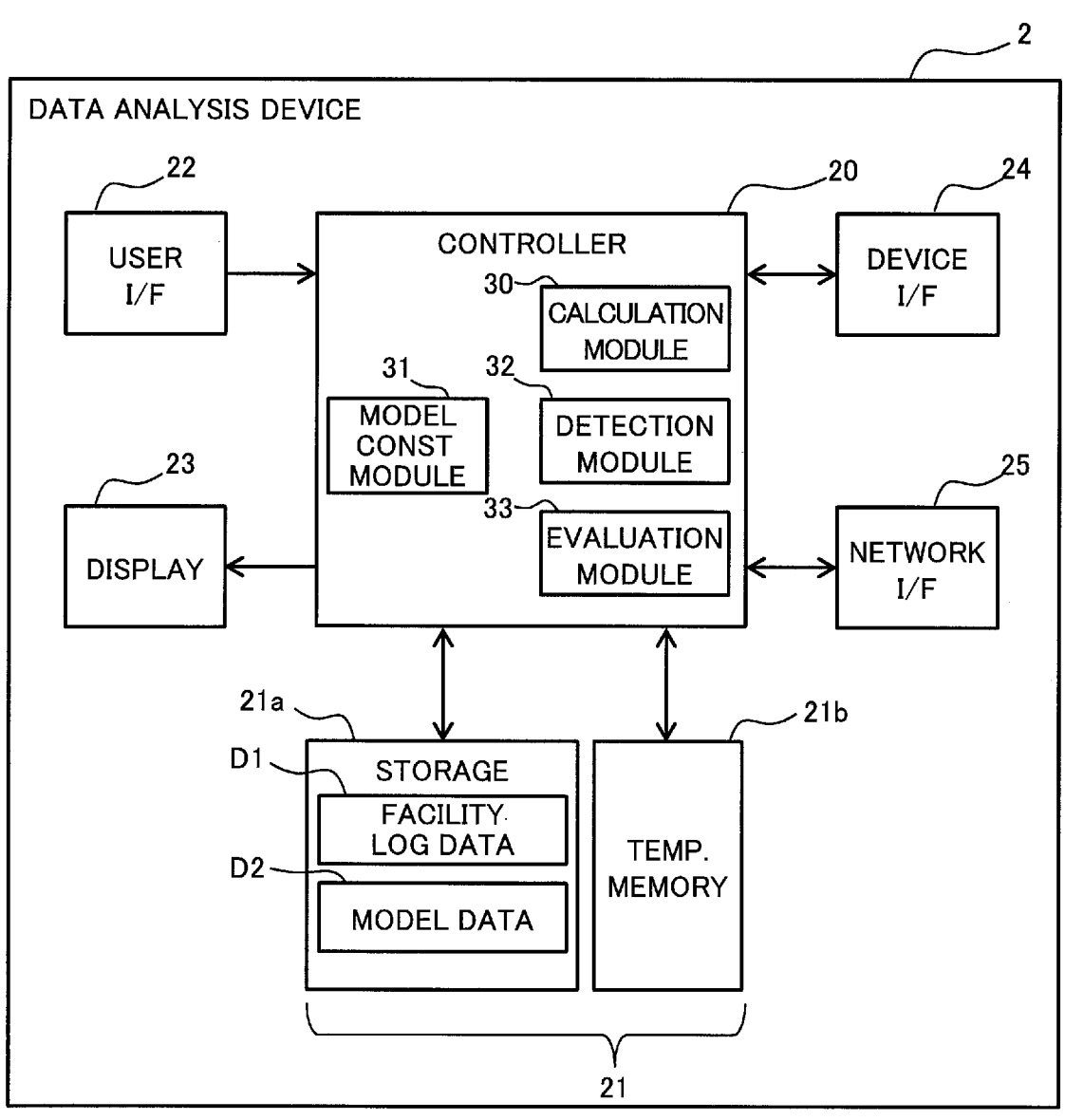
FIG. 2 is a block diagram illustrating a configuration of the data analysis device.

A configuration of the data analysis device 2 according to the present embodiment will be described with reference to FIGS. 2 and 3. FIG. 2 is a block diagram illustrating a configuration of the data analysis device 2.

The data analysis device 2 includes an information processing device such as a PC. The data analysis device 2 illustrated in FIG. 2 includes a controller 20, a memory 21, a user interface 22, a display 23, a device interface 24, and a network interface 25. Hereinafter, "interface" will be abbreviated as "I/F".

For example, the controller 20 as an example of a control circuit includes a CPU or an MPU that realizes a predetermined function in cooperation with software, to control overall operation of the data analysis device 2. The controller 20 reads data and a program stored in the memory 21 and performs various arithmetic processing to realize various functions.

For example, the controller 20 includes a calculation module 30, a model construction module 31, a detection module 32, and an evaluation module 33 as functional configurations. The calculation module 30 calculates various observation values from the facility log data D1. The model construction module 31 executes model construction operation to generate a line takt estimation model 4 (see FIG. 5), which will be described later. The detection module 32 detects fault of the manufacturing line 10 by using the line takt estimation model. The evaluation module 33 evaluates a factor of fault by using the line takt estimation model. Operation of various functions of the data analysis device 2 will be described later.

For example, the controller 20 executes various programs including commands for realizing a function, data analysis operation, or model construction operation of the data analysis device 2 as described above. The program may be provided from a communication network such as the Internet, or may be stored in a portable recording medium. Note that the controller 20 may be a hardware circuit such as a dedicated electronic circuit or a reconfigurable electronic circuit designed to realize the functions. The controller 20 may be composed of various semiconductor integrated circuits such as a CPU, an MPU, a GPU, a GPGPU, a TPU, a microcomputer, a DSP, an FPGA and an ASIC.

The memory 21 is a storage medium that stores a program and data necessary for realizing a function of the data analysis device 2. As illustrated in FIG. 2, the memory 21 includes a storage 21a and a temporary memory 21b.

The storage 21a stores a parameter, data, a control program, and the like for realizing a predetermined function. The storage 21a is composed of an HDD or an SSD, for example. For example, the storage 21a stores the above-described program, the facility log data D1, model data D2, and the like.

The facility log data D1 is an example of log data that records various information of a history of each process executed in each of the facilities 11 for each time an assembly line operation in the manufacturing line 10 is performed. The model data D2 is data constituting a line takt estimation model (details will be described later). An example of the facility log data D1 is illustrated in FIG. 3.

As illustrated in FIG. 3, the facility log data D1 includes operation log data D11 and error log data D12, for example. For example, the operation log data D11 records "manufactured product number", "lot number", "line number", "facility name", "structural parameter s", "structural parameter l", "start time", "end time", "stop time", "number of manufactured products", and "number of non-defective products" in association with each other. In the facility log data D1, a history of an assembly line operation operated in the manufacturing line 10 is managed for each lot by a "lot number" that identifies the lot of manufactured products, for example.

For example, for the production of one lot of manufactured products having a "manufactured product number", it is recorded that each of the facilities 11 identified by a "facility name" in the manufacturing line 10 identified by a "line number" operates from a "start time" to an "end time" and stops for "stop time" during the operation. Furthermore, it is recorded that manufactured products as many as the "number of manufactured products" are obtained at that time, and non-defective products as many as the "number of non-defective products" among the manufactured products are obtained. The structural parameters s and l are set according to a structure of a manufactured product or the like. For example, the error log data D12 in the facility log data D1 records, in each lot, "stop time" and "number of stops" in which the facility 11 of "facility name" stops for each "error code" that identifies a type of an error.

Returning to FIG. 2, the temporary memory 21b is composed of a RAM such as a DRAM or an SRAM, to temporarily store (i.e., hold) data, for example. The temporary memory 21b may function as a work area of the controller 20, or may be composed of a storage area in an internal memory of the controller 20.

The user interface 22 is a general term for operation members operated by the user. The user interface 22 may be a touch panel together with the display 23. The user interface 22 is not limited to the touch panel, and may be a keyboard, a touch pad, a button, a switch, or the like, for example. The user interface 22 is an example of an input interface that acquires various information input by operation of the user.

The display 23 is an example of an output interface including a liquid crystal display or an organic EL display, for example. The display 23 may display various information such as various icons for operating the user interface 22 and information input from the user interface 22.

The device I/F 24 is a circuit for connecting an external device to the data analysis device 2. The device I/F 24 is an example of a communication interface that performs communication according to a predetermined communication standard. The predetermined standard includes USB, HDMI (registered trademark), IEEE1395, WiFi, Bluetooth, and the like. The device I/F 24 may constitute an input interface that receives various information from or an output interface that transmits various information to an external device in the data analysis device 2.

The network I/F 25 is a circuit for connecting the data analysis device 2 to a communication network via a wireless or wired communication line. The network I/F 25 is an example of a communication interface that performs communication conforming to a predetermined communication standard. The predetermined communication standard includes communication standards such as IEEE802.3 and IEEE802.11a/11b/11g/11ac. The network I/F 25 may constitute an input interface that receives various information or an output interface that transmits various information via a communication network in the data analysis device 2.

The configuration of the data analysis device 2 as described above is an example, and the configuration of the data analysis device 2 is not limited to this. The data analysis device 2 may be configured by various computers including a server device. Each of data analysis operation and model construction operation of the present embodiment may be executed in distributed computing. The input interface in the data analysis device 2 may be realized by cooperation with various kinds of software in the controller 20 or the like. The input interface in the data analysis device 2 may acquire various information by reading various information stored in various storage media (e.g., the storage 21a) into a work area (e.g., the temporary memory 21b) of the controller 20.

2. Operation

Operation of the data analysis device 2 configured as described above will be described below.

2-1. Overall Operation

Figure 4A:
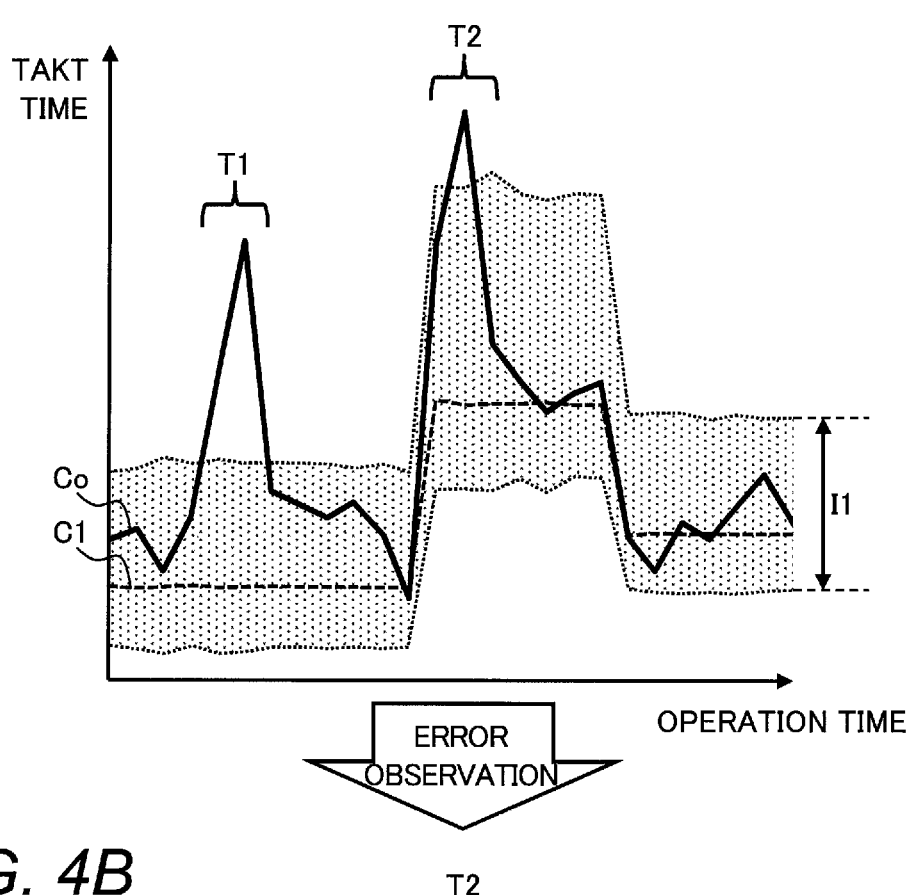
FIGS. 4A and 4B are diagrams for explaining an outline of data analysis operation of a manufacturing line.
Figure 4B:
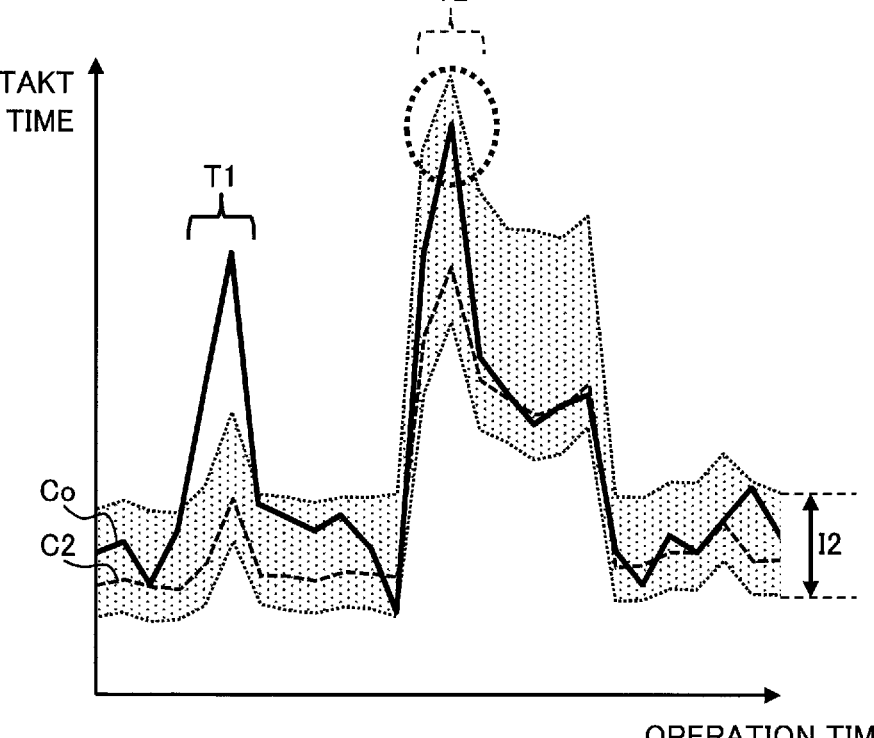

Overall operation of the data analysis device 2 in the present embodiment will be described with reference to FIGS. 1 to 4B. FIGS. 4A and 4B are diagrams for explaining an outline of data analysis operation of the manufacturing line 10 in the data analysis device 2.

In the present embodiment, the model construction module 31 of the data analysis device 2 performs model construction operation to construct the line takt estimation model 4 by machine learning based on the facility log data D1 that is accumulated, for example. The line takt estimation model 4 is a probability model that estimates takt time in the manufacturing line 10 by Bayesian inference. The line takt estimation model 4 is configured to be capable of executing estimation regarding various factors that cause fault of performance deterioration, and inputting an observation value regarding the factors as additional knowledge.

The data analysis device 2 of the present embodiment executes data analysis operation using the constructed line takt estimation model 4 to manage the production performance of the manufacturing line 10. For example, the detection module 32 of the data analysis device 2 detects, as fault of the manufacturing line 10, a case where the production performance is significantly deteriorated more than an estimation result by the line takt estimation model 4 from an observation value in the facility log data D1 subject to the data analysis operation.

FIG. 4A illustrates an example of an estimation result by the line takt estimation model 4. The horizontal axis of FIG. 4A indicates operation time in which the manufacturing line 10 operates, and the vertical axis indicates takt time of the manufacturing line 10 (the same applies to FIG. 43). For example, the takt time on the vertical axis is effective takt described later.

In FIG. 4A, an estimated curve C1 and a confidence interval I1 are illustrated as an estimation result by the line takt estimation model 4 together with an observation curve Co indicating an observation value of effective takt. The estimated curve C1 indicates a median value in probability distribution obtained as an estimation result of effective takt at each time point by the line takt estimation model 4. The confidence interval I1 indicates a section defined by a predetermined confidence level in probability distribution of each time. For example, the confidence interval I1 with the confidence level of 95% is in the range of 2.5% to 97.5% in the probability distribution.

In the example of FIG. 4A, the observation curve Co greatly exceeds the estimated curve C1 to be over an upper limit of the confidence interval I1 at time T1 and T2. That is, in the time T1 and T2, it is inferred that the production performance is deteriorated as actual takt time is greatly increased more than the estimation result of the line takt estimation model 4. The data analysis device 2 of the present embodiment detects such time T1 and T2 as fault of the manufacturing line 10. For example, with respect to time T1 and T2 when fault of the manufacturing line 10 is detected, the evaluation module 33 of the data analysis device 2 inputs an observation value of various factors that may cause the fault to the line takt estimation model 4, to calculate the influence degree indicating an evaluation value of influence of each factor on the fault of the manufacturing line 10.

FIG. 43 illustrates an estimation result by the line takt estimation model 4 in a case where an observation value related to a specific error is input from the state of FIG. 4A. In FIG. 4B, the observation curve Co is similar to that in FIG. 4A. In contrast, an estimated curve C2 and a confidence interval I2 are changed from the estimated curve C1 and the confidence interval I1 in FIG. 4A in response to the acquisition of an observation value of an input error by the line takt estimation model 4.

In the example of FIG. 4B, the observation curve Co gets within a range of the confidence interval 12 at time T2. That is, it is considered that the time T2 of fault can be estimated by the estimation result of the line takt estimation model 4 in the state in which the observation value of the input error is known. In contrast, at time T1, the observation curve Co remains over an upper limit of the confidence interval 12. The above shows that the influence of the input error is larger for fault of time T2 and smaller for fault of time T1. The data analysis operation of the present embodiment calculates the influence degree as described above for each factor such as various errors by using the line takt estimation model 4, so that a factor of fault is quantitatively evaluated.

In the manufacturing line 10 to which various data analysis methods as described above are applied in the present embodiment, a plurality of the facilities 11 are connected in series in order of processes via the work-in-process buffer 12. Each of the facilities 11 has takt time for executing each process. In the manufacturing line 10, in addition to error stop of the individual facilities 11, a situation such as waiting for a preceding process or waiting for a subsequent process may occur due to a difference in takt time between preceding and subsequent processes.

In view of the above situation, an object is to realize analyzing what factor of which facility a cause of fault is, at the time of fault when the production performance of the entire manufacturing line 10 is deteriorated. In view of the above, in the present embodiment, the line takt estimation model 4 is constructed so that the degree of influence of an error or the like of each of the facilities 11 in each process on the entire manufacturing line 10 is also reflected.

2-2. Line Takt Estimation Model

The line takt estimation model 4 in the present embodiment will be described with reference to FIG. 5.

Figure 5:
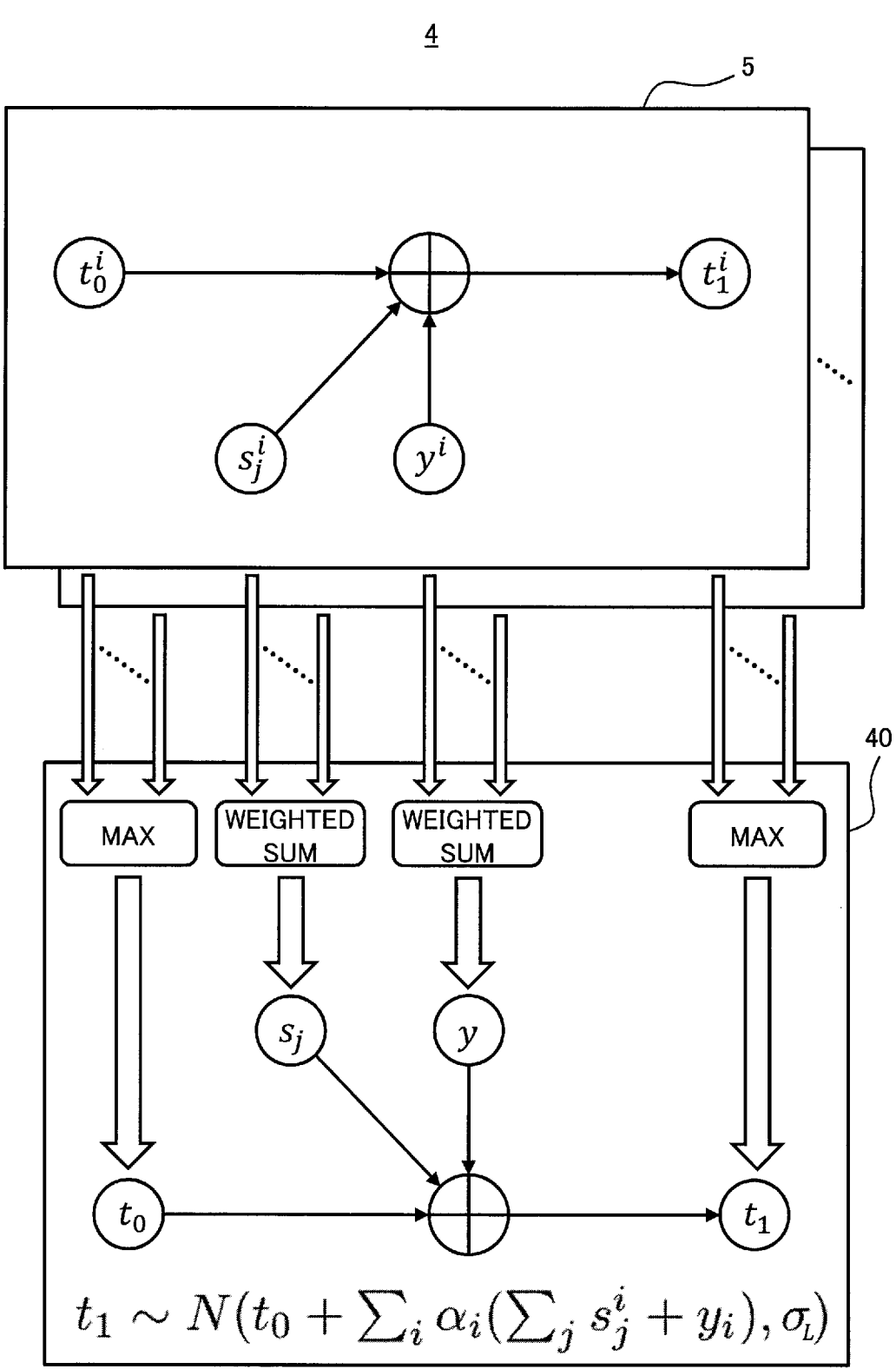
FIG. 5 is a diagram for explaining a line takt estimation model in the data analysis device.

For example, as illustrated in FIG. 5, the line takt estimation model 4 according to the present embodiment includes first to n-th takt estimators 5 provided for each of the facilities 11 included in the manufacturing line 10, and a line integrator 40 that integrates estimation results by the takt estimators 5. The line takt estimation model 4 of the present embodiment corresponds to one of the manufacturing line 10. The data analysis device 2 may construct a plurality of the line takt estimation models 4 for each of the manufacturing lines 10.

The i-th takt estimator 5 in the line takt estimation model 4 is configured by a probability model corresponding to the facility 11 of an i-th process in the manufacturing line 10 (i is a natural number of 1 to n). In the present embodiment, each of the takt estimators 5 is constructed from the viewpoint of decomposing effective takt time for each of the facilities 11 into a plurality of factors as in a relational expression (1) below, for example (details will be described later).

$$Ot/Pc + Ot(Pc - Gc)/(Pc \cdot Gc) + Et/Gc = Mt/Gc \tag{1}$$

In the above expression (1), Ot is manufacturing time, Pc is the number of manufactured products, Gc is the number of non-defective products, Et is error stop time, and Mt is operating time. The above times and numbers are managed for each lot in the facility log data D1, for example. For example, the operating time Mt indicates a length of time in which the specific facility 11 is operated when one lot of manufactured products are manufactured. The manufacturing time Ot indicates a time length required for manufacturing, i.e. execution of a process by the facility 11, in the operating time Mt. The error stop time Et indicates a time length during stop of manufacturing due to various errors in the facility 11 in the operating time Mt. The number Pt of manufactured products indicates the number of manufactured products manufactured in one lot, for example. The number Gc of non-defective products indicates the number of non-defective products that are not defective products among the number Pt of manufactured products.

In the above expression (1), the first term on the left side indicates ideal takt, the second term indicates a defective time width, the third term indicates an error time width, and the right side indicates effective takt. The ideal takt is takt time per manufactured product in an ideal case where neither a defective product nor a stop due to an error is generated. For example, the ideal takt corresponds to efficiency of each process that varies according to a type of a manufactured product and various settings of the facility 11. The defective time width is a time width obtained by converting a time length inferred to be spent in manufacturing a defective product during the manufacturing time Ot into a time width per non-defective product. The error time width is a time width obtained by converting the error stop time Et into a time width per non-defective product. The effective takt is effective takt time per non-defective product taking influence of a defective product and an error into account.

Hereinafter, the ideal takt in the facility 11 of the i-th process in the manufacturing line 10 is referred to as "$t_0^i$", the defective time width is referred to as "$y^i$", the error time width is referred to as "$\Sigma_j s_j^i$", and the effective takt is referred to as "$t_i^i$". Here, the error time width $E_j s_j^i$ is the sum of an error time width $s_j^i$ for each error code. The i-th takt estimator 5 is constructed to generate the probability distribution of each of the ideal takt $t_0^i$, the defective time width $y^i$, the various error time widths $s_j^i$, and the effective takt $t_i^i$ by Bayesian inference based on the facility log data D1 for the facility 11 in the i-th process (details will be described later).

In the line takt estimation model 4 of the present embodiment, the line integrator 40 integrates calculation results by each of the takt estimators 5 for each facility 11 so as to reflect a relation among the facilities 11 in the manufacturing line 10. For example, it is expected that the slowest takt time among the takt times for each of the facilities 11 determines the rate of the entire manufacturing line 10. In view of reflecting such a situation, the ideal takt to and the effective takt $t_1$ of the entire manufacturing line 10 are expressed as equations (2) and (3) below.

$$t_0 = \max_i(t_0^i) \tag{2}$$

$$t_1 = \max_i(t_1^i) \tag{3}$$

The above equation (2) takes a maximum value in the range of i=1 to n, that is, the ideal takt $t_0^1$ to $t_0^n$ of the respective facilities 11 of the first process to the n-th process in the manufacturing line 10. Similarly, the equation (3) takes a maximum value in effective takt $t_1^1$ to $t_1^n$ of each of the facilities 11.

The line takt estimation model 4 of the present embodiment also takes error stop and defective product manufacturing as factors of productivity deterioration in the entire manufacturing line 10 as in the case of that per facility 11. For example, when the facility 11 in the i-th process is stopped due to an error in the manufacturing line 10, it is expected that the facility 11 in a subsequent process can operate without a waiting state by an amount of works-in-process stored in advance in the work-in-process buffer 12 between the two processes. Further, when the facility 11 in the i-th process is stopped, it is expected that the facility 11 in the previous process can be operated without a waiting state unless the work-in-process buffer 12 between the two processes fills up to the allowable amount.

As described above, it is expected that the influence of error stop and the like by each of the facilities 11 in the manufacturing line 10 is alleviated by the work-in-process buffer 12. For reflecting the action of the work-in-process buffer 12, in the present embodiment, an absorption coefficient $\alpha_i$ for each of the facilities 11 is introduced as in equation (4) below.

$$t_0+\Sigma_i\alpha_i(\Sigma_j s_j^i+y^i)=t_1 \qquad (4)$$

In the above equation (4), a weighted sum weighting the error time width $\Sigma_j s_j^i$ and the defective time width $y_i$ of each of the facilities 11 is obtained by the absorption coefficients $\alpha_i$ from i=1 to n in the manufacturing line 10. The i-th absorption coefficient $\alpha_i$ corresponds to the facility 11 of the i-th process. Each of the absorption coefficients $\alpha_i$ is set to a value of zero or more and one or less.

In the line takt estimation model 4 of the present embodiment, the i-th absorption coefficient $\alpha_i$ is set closer to "zero" as the allowable amount of the work-in-process buffer 12 before or after the i-th process facility 11 is larger. The absorption coefficient $\alpha_i$ is set closer to "one" as the allowable amount is smaller in the line integrator 40. The absorption coefficient $\alpha_i$ for each of the facilities 11 can reflect, into the line takt estimation model 4, the fact that the work-in-process buffer 12 reduces the influence of the error stop and the like of the i-th process in the effective takt $t_1$ of the manufacturing line 10.

The line integrator 40 of the line takt estimation model 4 calculates effective takt distribution $D(t_1)$, which is the probability distribution of the effective takt $t_1$ of the manufacturing line 10, as in following equation (5) for example.

$$D(t_1)=N(t_0+\Sigma_i\alpha_i(\Sigma_j s_j^i+y^i),\sigma_L) \qquad (5)$$

In the above equation (5), N ($\mu$, $\sigma$) represents normal distribution of an average $\mu$ and standard deviation $\sigma$. In the present embodiment, a model parameter $\sigma_L$ of the effective takt distribution $D(t_1)$ of the manufacturing line 10 is set in the line integrator 40 as probability distribution by Bayesian inference. The effective takt distribution $D(t_1)$ is an example of the work efficiency distribution for the effective takt $t_1$ corresponding to efficiency of an assembly line operation in the manufacturing line 10.

In addition to use of estimation results of the takt estimators 5 in the calculation of the above equation (5), the line takt estimation model 4 of the present embodiment can use an observation value of the facility log data D1 instead of a part or all of the estimation results. Note that a functional form of the effective takt distribution $D(t_1)$ of the manufacturing line 10 is not particularly limited to normal distribution as in the equation (5), and may be log-normal distribution, for example.

2-2-1. Takt Estimator

Details of the takt estimators 5 for each of the facilities 11 in the line takt estimation model 4 of the present embodiment will be described with reference to FIG. 6.

Figure 6:
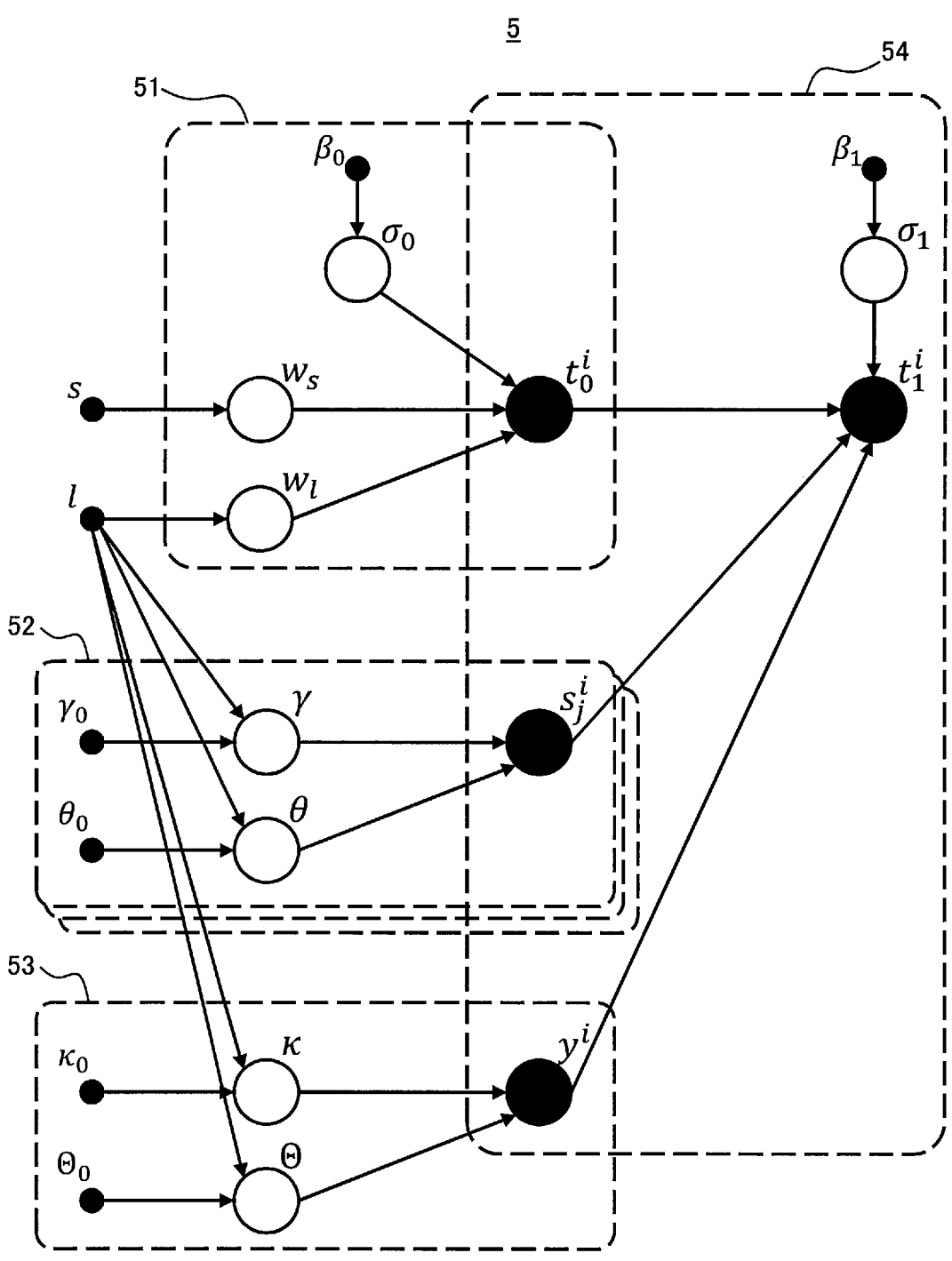
FIG. 6 is a diagram for explaining a takt estimator in the line takt estimation model.

In FIG. 6, the i-th takt estimator 5 is indicated by a DAG (effective acyclic graph). In FIG. 6, a larger black circle indicates a variable to be estimated as an observed random variable. A white circle indicates a model parameter which is an unobservable random variable referred to as a latent variable. A smaller black circle indicates a parameter given as a predetermined value, and includes a hyperparameter set in advance before machine learning and a parameter indicating a manufacturing condition, for example.

Each of the takt estimators 5 includes an ideal takt model 51, an error stop model 52, a defect time model 53, and an effective takt model 54. For example, in the structural parameters s and l indicating a manufacturing condition of an estimation target in each of the takt estimators 5, the structural parameter s is input to the ideal takt model 51, and the structural parameter l is input to the ideal takt model 51, the error stop model 52, and the defect time model 53.

In the i-th takt estimator 5, the ideal takt model 51 is a probability model that estimates the ideal takt $t_0^i$ of the facility 11 of the i-th process, and has model parameters $w_s$, $w_l$, $\sigma_0$ and a hyperparameter pp, for example. The ideal takt model 51 calculates the ideal takt distribution $D(t_0^i)$, which is probability distribution of the ideal takt $t_0^i$ of the i-th process, as in equation (11) below for example.

$$D(t_0^i)=N(w_s s+w_l l,\sigma_0) \qquad (11)$$

The ideal takt distribution $D(t_0^i)$ is an example of process efficiency distribution in the present embodiment.

In the present embodiment, the variables s and l representing structural parameters are categorical discrete values. For example, s and l in the above equation (11) are vectors with the number of dimensions being the number of types of categories, wherein the vectors are one only in a dimension corresponding to a category to which s and l belong and are zero in other dimensions. The model parameters $w_s$ and $w_l$ are vectors of the same dimension as s and l, and are random variables representing weights for each category of s and l. The model parameter $\sigma_0$ is a random variable representing fluctuation of the ideal takt $t_0^i$, and distribution based on the hyperparameter $\beta_0$ is set as prior distribution. These model parameters $w_s$, $w_l$, and $\sigma_0$ are estimated by Bayesian inference.

The error stop model 52 is a probability model that estimates the error time width $s_j^i$ of various errors in the facility 11, and has model parameters $\gamma$ and $\theta$ and hyperparameters $\gamma_0$ and $\theta_0$ for each error code, for example. The error stop model 52 calculates error stop distribution $D(s_j^i)$, which is probability distribution of each of the error time widths $s_j^i$, as in equation (12) below for example.

$$D(s_j^i)=\text{Exp}_0(\gamma,\theta) \qquad (12)$$

In the above equation (12), $\text{Exp}_0(\gamma, \theta)$ indicates a zero excess exponential distribution obtained by combining exponential distribution and Bernoulli distribution, and is defined as equation (13) below as probability density $\text{Exp}_0$ (x; $\gamma$, $\theta$) at which a value x is generated.

$$\text{Exp}_0(x=0;\gamma,\theta)=\theta$$

$$\text{Exp}_0(x\neq0;\gamma,\theta)=(1-\theta)\gamma e^{-\gamma x} \qquad (13)$$

According to the zero excess exponential distribution as in the above equation (13), it is possible to obtain distribution including more cases of x=0 than the exponential distribution. For example, the model parameters $\gamma$ and $\theta$ of each error code have different values according to the structural parameter l, and are estimated by machine learning based on the hyperparameters $\gamma_0$ and $\theta_0$.

The defect time model 53 is a probability model that estimates the defective time width $y^i$ of the facility 11, and has model parameters $\kappa$ and $\Theta$ and hyperparameters $\kappa_0$ and $\theta_0$, for example. The defect time model 53 calculates defective time distribution $D(y^i)$, which is probability distribution of the defective time width $y^i$, as in equation (14) below for example.

$$D(y^i)=\Gamma(\kappa,\Theta) \qquad (14)$$

In the above equation (14), $\Gamma(x; \kappa, \Theta)$ represents so-called gamma distribution. For example, each of the model parameters $\kappa$ and $\Theta$ of the defect time model 53 has a different value according to the structural parameter 1, and is estimated by machine learning based on each of the hyperparameters $\kappa_0$ and $\Theta_0$. Each of the distributions $D(t_0{}^i)$, $D(y^i)$, and $D(s_j{}^i)$ is an example of variation factor distribution in the present embodiment.

The effective takt model 54 is a probability model that estimates the effective takt $t_1{}^i$ of the facility 11, and has a model parameter $\sigma_l$ and a hyperparameter $\beta_1$, for example. The effective takt model 54 of the i-th takt estimator 5 calculates the effective takt distribution $D(t_1{}^i)$ for the effective takt $t_1{}^i$ of the facility 11 in the i-th process as in equation (15) below, for example.

$$D(t_1{}^i)=N(t_0{}^i+\Sigma_j s_j{}^i+y^i,\sigma_i) \tag{15}$$

According to the above equation (15), it is regarded that the effective takt $t_1{}^i$ of the facility 11 in the i-th process follows normal distribution in which the sum of the ideal takt $t_0{}^i$, each of the error time widths $s_j{}^i$, and the defective time width $y^i$ is set as an average value. In the i-th takt estimator 5, the effective takt model 54 may use calculation results of the ideal takt model 51, the error stop model 52, and the defect time model 53 or an observation value of the facility log data D1 in the calculation of the above equation (15). The model parameter $\sigma_1$ of the effective takt model 54 is estimated by machine learning with distribution based on the hyperparameter $\beta_1$ as prior distribution so as to represent fluctuation of the effective takt $t_1{}^i$.

The functional forms of the various distributions $D(t_0{}^i)$, $D(s_j{}^i)$, $D(y^i)$, and $D(t_1{}^i)$ for each process described above are merely examples, and are not particularly limited to the equations (11), (12), (14), and (15), respectively. For example, a functional form of various probability distribution such as log-normal distribution may be appropriately employed. Further, although the example in which model parameters have different values depending on the structural parameters s and l is shown, other variables such as a facility number may act on the model parameters.

2-3. Model Construction Operation

Model construction operation for constructing the above-described line takt estimation model 4 will be described with reference to FIGS. 7 and 8.

Figure 7:
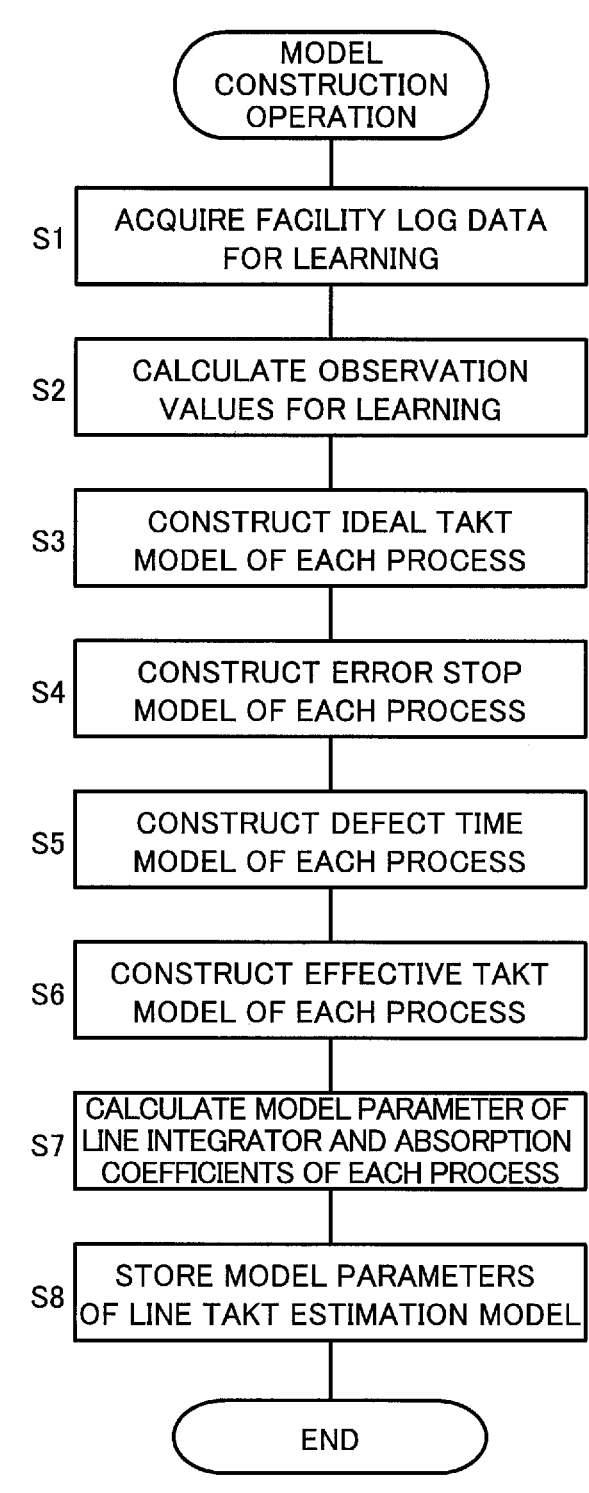
FIG. 7 is a flowchart illustrating model construction operation in the data analysis device.

FIG. 7 is a flowchart illustrating model construction operation in the data analysis device 2. Each processing shown in the flowchart of FIG. 7 is executed by the controller 20 of the data analysis device 2, for example.

At first, the controller 20 acquires the facility log data D1 used for machine learning from the memory 21, for example (S1). For example, the facility log data D1 for several months in the past is accumulated and acquired in the memory 21 in advance.

Next, the controller 20, functioning as the calculation module 30, calculates observation values of the ideal takt $t_0{}^i$, the various error time widths $s_j{}^i$, the defective time width $y^i$, and the effective takt $t_1{}^i$ as a data set for learning from the acquired facility log data D1 (S2). For example, the data set for learning includes a set of an observation value and the structural parameters s and l for each of the facilities 11 of each lot, and includes e.g. N sets of the observation values.

Hereinafter, an observation value in the data set for learning is assigned with a superscript "(N)". For example, the calculation module 30 obtains the maximum values of the ideal takts $t_0{}^{i(N)}$ and the effective takts $t_1{}^{i(N)}$ in all processes, respectively as an ideal takt $t_0{}^{(N)}$ and an effective takt $t_1{}^{(N)}$ for the manufacturing line 10, for each set in the data set for learning as in the equations (2) and (3). Thereafter, the controller 20 functions as the model construction module 31 (S2 to S8).

For example, the controller 20 constructs the ideal takt model 51 of each process in the first to n-th takt estimators 5, based on the ideal takt $t_0{}^{i(N)}$ of each process in the data set for learning and the structural parameters s and l (S3). For example, the ideal takt model 51 in the i-th takt estimator 5 is constructed by estimating distribution of the model parameters $w_s$, $w_l$, and $\sigma_0$ that change for each of the structural parameters s and I from the observed ideal takt $t_0{}^{i(N)}$ of the i-th process. This parameter estimation is performed by Bayesian inference according to equation (20) below.

$$p(w_s,w_l,\sigma_0|t_0{}^{i(N)},s,l)$$

$$\propto p(t_0{}^{i(N)}|s,l;w_s,w_l,\sigma_0)p(w_s,w_l,\sigma_0)$$

$$=N(t_0{}^{i(N)};w_s s+w_l l,\sigma_0)p(w_s,w_l,\sigma_0) \tag{20}$$

The above equation (20) is based on Bayes' theorem and the equation (11). In the above equation (20), the left side is posterior distribution of the model parameters $w_s$, $w_l$, and $\sigma_0$, which indicates probability distribution in a state in which an observation value for learning is obtained. In the right side of the above equation (20), $N(x^{(N)}; \mu, \sigma)$ means the likelihood of an observation value $x^{(N)}$ with respect to normal distribution of the average $\mu$ and the standard deviation $\sigma$. Further, $p(w_s, w_l, \sigma_0)$ is prior distribution, which sets distribution giving uniform probability for every value in a domain generally.

In Step S3, by applying the Markov Chain Monte Carlo (MCMC) method to the above equation (20), for example, the controller 20 calculates a sample group of the model parameters $w_s$, $w_l$, and $\sigma_0$ changing for each of the structural parameters s and 1. Each sample group includes M sample values according to the distribution on the left side of the above equation (20) in random order (see FIG. 8). For example, M is 1000 to 10,000. The controller 20 constructs the ideal takt model 51 of each process by performing the above calculation for the first to n-th processes.

The controller 20 constructs the error stop model 52 for each error in the respective processes, based on various error time widths $s_j{}^{i(N)}$ and the structural parameter l in the data set for learning (S4). The error stop model 52 of a j-th error code in the i-th process is constructed by Bayesian inference using the equation (12) instead of the equation (11) in the above equation (20) based on the observed error time width $s_j{}^{i(N)}$. For example, as in Step S3, the controller 20 calculates a sample group according to posterior distribution of the model parameters $\gamma$ and $\theta$ changing for each error code and each of the structural parameters 1 in each process.

The controller 20 constructs the defect time model 53 of each process, based on the defective time width $y^{i(N)}$ and the structural parameter 1 in a data set for learning (S5). The defect time model 53 of the i-th process is constructed by Bayesian inference using the equation (14) instead of the equation (11) in the above equation (20). For example, as in Step S3, the controller 20 calculates a sample group according to posterior distribution of the model parameters $\kappa$ and $\Theta$ changing for each of the structural parameters 1 in each process.

The controller 20 constructs the effective takt model 54 of each process in the first to n-th takt estimators 5, based on the effective takt $t_1{}^{i(N)}$ of each process in the data set for learning and the like (S6). The effective takt model 54 of the i-th process is constructed by Bayesian inference using the equation (15) instead of the equation (11) in the above equation (20). For example, as in Step S3, the controller 20 calculates a sample group according to posterior distribution of the model parameter $\sigma_1$ for each process. In this processing, various values in the data set for learning can be appropriately used, for example.

Furthermore, the controller 20 calculates the model parameter $\sigma_L$ and each of the absorption coefficients $\alpha_i$ in the line integrator 40 of the line takt estimation model 4, based on various observation values $t_0^{(N)} s_j^{i(N)}$, $y^{i(N)}$, and $t_1^{(N)}$ in the data set for learning (S7). For example, by Bayesian inference using the equation (5) instead of the equation (11) in the above equation (20), the controller 20 calculates a sample group according to posterior distribution of the model parameter $\sigma_L$ and each of the absorption coefficients $\alpha_i$, similarly to Step S3. It should be noted that, unlike the case of the error stop model 52 for each process, the takt estimation model of a line does not take process waiting stop time due to preceding process delay or next process delay into consideration as an error stop type. Furthermore, the controller 20 calculates an average of sample values in a sample group for each of the absorption coefficient $\alpha_i$ to calculate a coefficient value in each process.

The controller 20 stores distribution of various model parameters of the line takt estimation model 4 calculated as described above and a setting value of each of the absorption coefficients $\alpha_i$ in the memory 21 as the model data D2 (S8). An example of the model data D2 is illustrated in FIG. 8. FIG. 8 illustrates a state in which distributions of the model parameters $w_s$ and $w_l$ of the ideal takt model 51 of one process are stored in the model data D2 of the line takt estimation model 4.

As illustrated in a column direction of FIG. 8, each of model parameters $w_s$ and $w_l$ has a plurality of components used according to values of the structural parameters s and l. A sample group of each of the model parameters $w_s$ and $w_l$ is stored as illustrated in each row of FIG. 8, for example. For example, in order of generation by the MCMC method, the controller 20 stores the sample values in each sample group (S8), to give randomness to the arrangement order of the sample values in each row.

After storing the model data D2 (S8), the controller 20 ends the model construction operation of FIG. 7.

According to the above model construction operation, the line takt estimation model 4 can be constructed by Bayesian inference using the facility log data D1 in the manufacturing line 10. That is, according to the model construction operation of the present embodiment, a model generation method for generating the line takt estimation model 4 is provided.

Further, the processing illustrated in the flowchart of FIG. 7 may also be applied when the constructed line takt estimation model 4 is reconstructed by machine learning of the new facility log data D1. For example, a sample group of posterior distribution in the constructed various models 51 to 54 may be used as prior distribution at the time of reconstruction.

2-4. Data Analysis Operation

A data analysis operation to analyze the production performance of the manufacturing line 10 in the data analysis device 2 using the line takt estimation model 4 constructed as described above will be described with reference to FIGS. 9 to 12.

Figure 9:
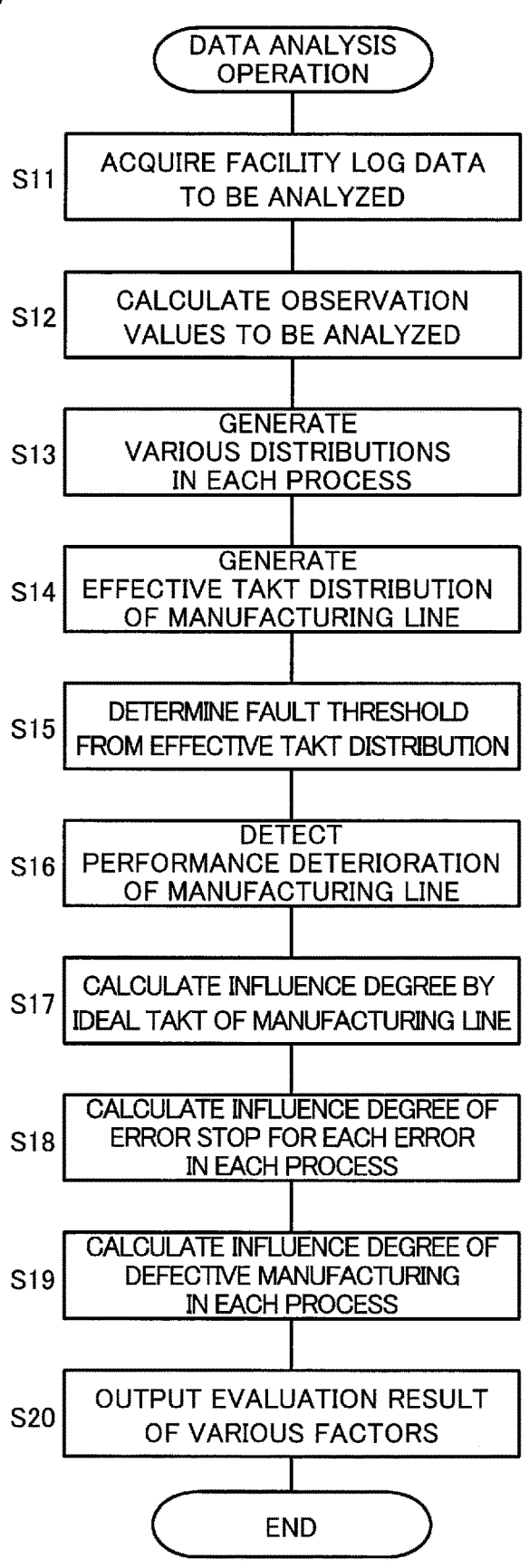
FIG. 9 is a flowchart illustrating data analysis operation of a manufacturing line.

FIG. 9 is a flowchart illustrating data analysis operation of the manufacturing line 10. For example, the processing illustrated in the flowchart of FIG. 9 starts with the model data D2, which indicates the line takt estimation model 4 constructed in advance, being stored in the memory 21. Each processing illustrated in this flowchart is executed by the controller 20 of the data analysis device 2, for example.

At first, the controller 20 of the data analysis device 2 acquires the facility log data D1 to be analyzed using the line takt estimation model 4 (S11). In Step S11 the facility log data D1 for several days is acquired, for example. For example, the facility log data D1 may be acquired from the user interface 22 by user operation, or may be acquired via the device I/F 24 or the network I/F 25.

Next, the controller 20, functioning as the calculation module 30, calculates various observation values to be analyzed from the acquired facility log data D1 (S12). Hereinafter, an observation value to be analyzed is assigned with a superscript "(V)". In Step S12, ideal takt $t_0^{i(V)}$, various error time widths $s_j^{i(V)}$, a defective time width $y^{i(V)}$, and effective takt $t_1^{i(V)}$ as observation values to be analyzed are calculated by calculation similar to Step S2 in FIG. 7. In addition, ideal takt $t_0^{(V)}$ and effective takt $t_1^{(V)}$ of the manufacturing line 10 are obtained as maximum values of the ideal takt $t_0^{i(V)}$ and the effective takt $t_1^{i(V)}$ in all processes as in the above equations (2) and (3).

The controller 20 generates various distributions in each process by Bayesian inference in the first to n-th takt estimators 5 in the line takt estimation model 4, according to the structural parameters s and l in the facility log data D1 to be analyzed, for example (S13). The controller 20 calculates the various models 51 to 54 of each of the takt estimators 5, based on the structural parameters s and l and the model data D2, and generates ideal takt distribution $D(t_0^i)$, error stop distribution $D(s_j^i)$, defective time distribution $D(y^i)$, and effective takt distribution $D(t_1^i)$ for each process (details will be described later).

Furthermore, the controller 20 generates the effective takt distribution $D(t_1)$ of the manufacturing line 10 by Bayesian inference, based on the various distributions of the first to n-th processes in the line integrator 40 of the line takt estimation model 4 (S14). In Step S14, the line integrator 40 performs calculation of the equation (5), based on the model parameter $\sigma_L$ and each of the absorption coefficients $\alpha_i$ in the model data D2 and the calculation result in Step S13.

In this step, based on ideal takt distribution $D(t_0^1)$ to $D(t_0'')$ of the first to n-th processes, the line integrator 40 uses distribution indicating a maximum value of the ideal takt $t_0^1$ to $t_0''$ of all processes as ideal takt distribution D(to) of the ideal takt to of the manufacturing line 10. The line integrator 40 weights error stop distributions $D(s_j^1)$ to $D(s_j'')$ and defective time distributions $D(y^1)$ to $D(y'')$ of the first to n-th processes by the first to n-th absorption coefficients $\alpha_i$, respectively, to takes the results into the calculation of effective takt distribution $(t_1)$. The details of the processing in Steps S13 and S14 will be described later.

Figure 10A:
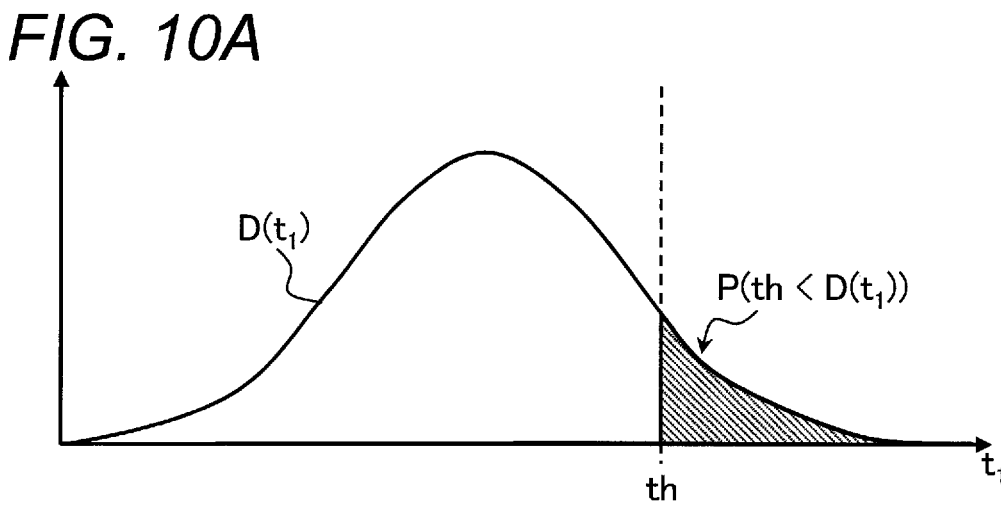
FIGS. 10A to 10C are diagrams for explaining the data analysis operation of a manufacturing line.

Based on the effective takt distribution $D(t_1)$ generated by the line takt estimation model 4, the controller 20 determines, as the detection module 32, a fault threshold th that is a threshold for determining fault of the manufacturing line 10 (S15). FIG. 10A illustrates a relation between the fault threshold th and the effective takt distribution $D(t_1)$.

The fault threshold th is set such that the probability for the effective takt $t_1$ to exceed the fault threshold th in the effective takt distribution $D(t_1)$, that is, upper probability P ($th<D(t_1)$) is a predetermined ratio. The upper probability P ($th<D(t_1)$) corresponds to an area of a shaded portion in FIG. 10A. The fault threshold th corresponds to an upper limit of a confidence interval in the effective takt distribution $D(t_1)$ (see FIG. 4A). For example, the predetermined ratio of the fault threshold th is 5% or the like, and is set complementarily to a confidence level of the confidence interval. In Step S15, the controller 20 determines each of the fault thresholds th by e.g. counting sample values in distribution in each of the effective takt distributions $D(t_1)$ calculated for each of the structural parameters s and 1.

Figure 10B:
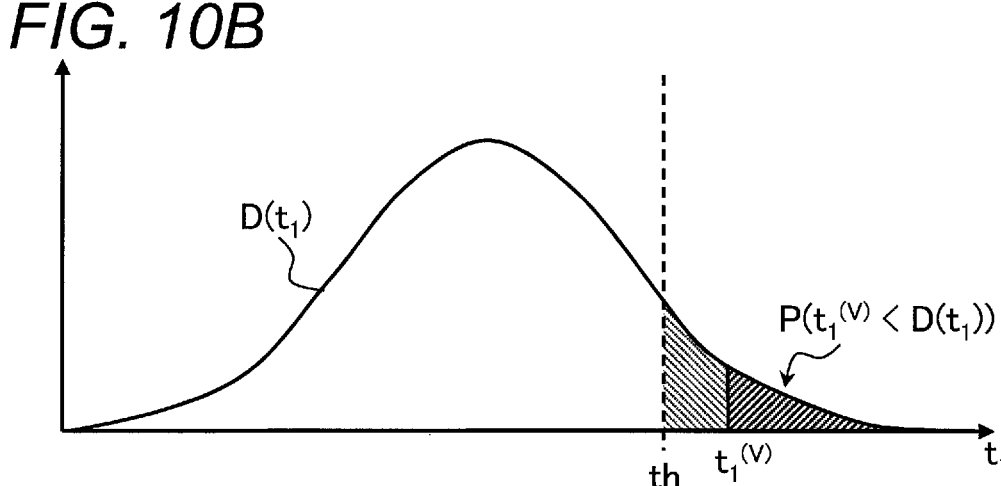

Next, the controller 20, functioning as the detection module 32, detects fault in which the performance deterioration of the manufacturing line 10 occurs, by using the calculated fault threshold th (S16). FIG. 10B illustrates a processing example of Step S16.

FIG. 10B illustrates an example in which fault is detected in the effective takt distribution $D(t_1)$ of FIG. 10A. In Step S16, by comparing the effective takt $t_1^{(V)}$ of the observation value in the facility log data D1 to be analyzed with the calculated fault threshold, the detection module 32 detects a case where the effective takt $t_1^{(V)}$ exceeds the fault threshold as fault of the manufacturing line 10. According to this, time T1 and T2 in the example of FIG. 4A are detected, for example. Note that the detection in Step S16 may be performed in units of lots, and warning display or the like regarding a lot in which fault is detected may be performed, for example.

The controller 20, hereinafter functioning as the evaluation module 33 for example, performs processing to evaluate the influence degree of various factors in the case where fault of the manufacturing line 10 is detected (S17 to S20). The influence degree is calculated on the basis of an information amount corresponding to a change in the output of the line takt estimation model 4 before and after input of an observation value for each factor to the line takt estimation model 4 in the case where fault is detected.

For example, based on the ideal takt $t_0^{(V)}$ of the manufacturing line 10 at the time of fault, the controller 20 calculates influence degree $I(t_0^{(V)})$ by the ideal takt $t_0^{(V)}$ of the manufacturing line 10 by calculation of equation (30) below (S17).

$$I(t_0^{(V)})=$$

$$=-\log[P(t_1^{(V)})<D(t_1))]$$

$$+\log[P(t_1^{(V)}<D(t_1|t_0^{(V)}))] \tag{30}$$

In the above equation (30), $D(X|Y)$ represents distribution of a random variable X under the condition that information Y is known. The logarithm $\log[\ ]$ is a binary logarithm, for example. The upper probability $P(t_1^{(V)}<D(t_1))$ in the first term on the right side of the above equation (30) is illustrated in FIG. 10B. The upper probability $P(t_1^{(V)})<D(t_1|t_0^{(V)}))$ in the second term on the right side is illustrated in FIG. 10C.

Figure 10C:
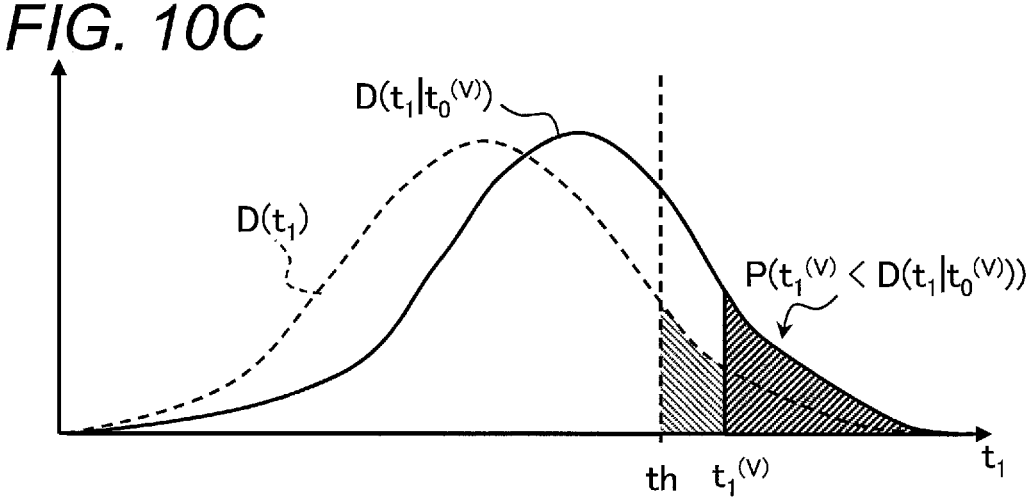

FIG. 10C illustrates effective takt distribution $D(t_1|t_0^{(V)}))$ under the condition that the ideal takt $t_0^{(V)}$ of the manufacturing line 10 of the observation value at the time of fault is known from FIG. 10B. As illustrated in FIGS. 10B and 100, the upper probabilities $P(t_1^{(V)}<D(t_1))$ and $P(t_1^{(V)}<D(t_1|t_0^{(V)}))$ for the effective takt $t_1^{(V)}$ at the time of fault change according to the knowledge of the ideal takt $t_0^{(V)}$ of the observation value. According to the above equation (30), influence degree $I(Y)$ can be calculated as an information amount quantitatively indicating the degree to which the situation where fault occurs is explainable by the information Y such as the ideal takt $t_0^{(V)}$.

In Step S17, the controller 20 can use a processing result of Step S14 as the effective takt distribution $D(t_1)$ of the first term of the above equation (30), for example. With respect to the second term of the equation (30), the controller 20 inputs, to the line takt estimation model 4, the ideal takt $t_0^{(V)}$ of an observation value at the time of fault, instead of the ideal takt distribution $D(t_0)$ of the manufacturing line 10, in process similar to Step S14, for example. According to this, the line takt estimation model 4 performs calculation, similar to the calculation in Step S14, to generate an effective takt distribution $D(t_1|t_0^{(V)}))$ whose ideal takt $t_0^{(V)}$ is known.

Further, the controller 20 calculates an influence degree $I(s_j^{i(V)})$ of error stop for each error code in each process, based on various error time widths $s_j^{i(V)}$ at the time of fault (S18). For example, the influence degree $I(s_j^{i(V)})$ by the j-th error time width $s_j^{i(V)}$ in the i-th process can be calculated by the similar processing to Step S17 with the error time width $s_j^{i(V)}$ being known instead of the ideal takt $t_0^{(V)}$ being known in the equation (30). In this processing, instead of the j-th error stop distribution $D(s_j^i)$ in the i-th process, by using the error time width $s_j^{i(V)}$ of the observation value at the time of fault, the line takt estimation model 4 generates the corresponding effective takt distribution $D(t_1|s_j^{i(V)})$.

Further, the controller 20 calculates an influence degree $I(y^{i(V)})$ of defective manufacturing in each process, based on the defective time width $y_i^{(V)}$ at the time of fault (S19). For example, the influence degree $I(y^{i(V)})$ by the defective time width $y_i^{(V)}$ of the i-th process can be calculated by the processing similar to Step S17 with the defective time width $y_i^{(V)}$ being known in place of the ideal takt $t_0^{(V)}$ in the equation (30). In this processing, instead of the defective time distribution $D(y^i)$ of the i-th process, by using the defective time width $y_i^{(V)}$ of the observation value at the time of fault, the line takt estimation model 4 generates the corresponding effective takt distribution $D(t_1|y^{i(V)})$.

Next, the controller 20 outputs a factor evaluation list D5 as an evaluation result of each factor, based on the calculated various influence degrees $I(t_0^{(V)})$, $I(s_j^{i(V)})$, and $I(y^{i(V)})$, for example (S20). FIG. 11 illustrates an example of the factor evaluation list D5 as an example of analysis information in the present embodiment.

The factor evaluation list D5 is a list enumerating factors having significant influence among various factors that may cause fault in the manufacturing line 10. In the example of FIG. 11, the factor evaluation list D5 displays "lot number" in which fault is detected, "facility" in the manufacturing line 10, "error code", "stop time" for each error code of each of the facilities 11, "number of stops", and "influence degree" in association with each other. In the factor evaluation list D5, various error stops and the like of the facilities 11 in the manufacturing line 10 can be compared in the same row.

In Step S20, the controller 20 extracts a predetermined number (e.g., 10 to 50) of factors in order from a factor having the largest influence degree $I(Y)$, to generate the factor evaluation list D5. The influence degree $I(Y)$ may be a negative value. This occurs in a case where, although the factor Y rather worked to improve the performance, the performance is deteriorated as a whole due to deterioration of other factors. The factor Y in which the influence degree $I(Y)$ has a negative value as described above may be deleted from the factor evaluation list D5. When defective manufacturing time or ideal takt of the various facilities 11 is extracted as a factor, the factor evaluation list D5 may display a name of such a factor instead of "error code". For example, the controller 20 outputs the factor evaluation list D5 to the display 23 to display. The output of Step S20 is not particularly limited to the above, and may be output in which the factor evaluation list D5 is recorded in the memory 21 or may be output to various output interfaces, for example.

After outputting the factor evaluation list D5 (S20), the controller 20 ends the data analysis operation of FIG. 9.

According to the above data analysis operation, it is possible to perform data analysis such as detecting fault in the manufacturing line 10, and evaluating the influence degree of various factors of the various facilities 11 inferred to be a cause of the detected fault, by using the line takt estimation model 4 constructed by Bayesian inference.

Details of the processing in Steps S13 and S14 in the above data analysis operation will be described. For example, the controller 20 performs generation of a sample (i.e., sampling) according to distribution by various model parameters in the model data D2 of FIG. 8 for each set by each column of a sample group of the model parameters, to execute the processing of Steps S13 and S14.

For example, in the ideal takt model 51 of the i-th process, K sets of sample values in the ideal takt distribution $D(t_0^i)$ are generated by using components corresponding to the structural parameters s and l to be analyzed in one column of the model parameters $w_s$, $w_l$, and $\sigma_0$ (e.g., K=1 to 10). The calculation of the model 51 is repeated M times according to the number of columns of the model data D2. According to this, a sample group including K×M sample values in random order is generated as a calculation result of the ideal takt distribution $D(t_0^i)$ per process.

The sample group of the ideal takt distribution $D(t_0^i)$ of each process is generated by the same operation as described above. FIG. 12A illustrates an ideal takt distribution table D6 illustrating the calculation result of each of the ideal takt distribution $D(t_0^i)$. For example, the ideal takt distribution table D6 is stored in the temporary memory 21b, and includes a plurality of rows in which each sample value of the sample group of the ideal takt distribution $D(t_0^i)$ per process is recorded. FIG. 12B illustrates a histogram of a sample group of each row in the ideal takt distribution table D6.

For example, in Step S13, the controller 20 stores sample values of the ideal takt distribution $D(t_0^i)$ for each process in order generated by sampling in each row of the ideal takt distribution table D6. Accordingly, randomness can be imparted to the arrangement order of sample values of the ideal takt distribution $D(t_0^i)$ in each row. Furthermore, in Step S14, the controller 20 applies the equation (2) for each column of the ideal takt distribution table D6 to generate a row including a sample group of K×M sample values configured with a maximum value of each column, for example. Accordingly, as shown in the histogram of FIG. 12B, the ideal takt distribution $D(t_0)$ of the manufacturing line 10 can be obtained, for example.

In Step S13, the various error stop distributions $D(s_j^i)$ for each process and the defective time distribution $D(y^i)$ for each process are also generated as a sample group similarly to the ideal takt distribution $D(t_0^i)$ for each process described above. Further, for calculation of the effective takt distribution $D(t_1^i)$ for each process, a set of sample values for each column in a sample group of the various distributions $D(t_0^i)$, $D(s_j^i)$, and $D(y^i)$ of the same process is used, for example. Further, in Step S14, a sample group of the effective takt distribution $D(t_1)$ of the manufacturing line 10 is calculated by using a set for each column of sample values of the distributions $D(s_j^i)$ and $D(y^i)$ in all processes together with the ideal takt distribution $D(t_0^i)$ described above.

3. Summary

The data analysis device 2 according to the present embodiment analyzes takt time corresponding to efficiency of an assembly line operation including a plurality of processes in the manufacturing line 10, for example. The data analysis device 2 includes various ones of the input interfaces 22, 24, and 25 and the controller 20 as an example of a control circuit. The input interface is configured to acquire the facility log data D1 that is an example of log data indicating a history of each process performed every time an assembly line operation is operated (S11). The controller 20 is configured to generate the factor evaluation list D5 as an example of the analysis information indicating an analysis result of the history indicated by the facility log data D1, based on information generated by the line takt estimation model which is an example of the probability model to calculate probability distribution with respect to the assembly line operation (S20). The line takt estimation model 4 is configured to generate the ideal takt distribution $D(t_0^i)$, the error stop distribution $D(s_j^i)$, and the defective time distribution $D(y^i)$ for each process in the assembly line operation (S13). The ideal takt distribution $D(t_0^i)$ for each process is an example of the process efficiency distribution indicating probability distribution of corresponding efficiency to each process in the assembly line operation. The line takt estimation model 4 is configured to generate the effective takt distribution $D(t_1^i)$ of the manufacturing line 10, which is an example of the work efficiency distribution indicating probability distribution of the efficiency of the assembly line operation, based on the various distributions $D(t_0^i)$, $D(s_j^i)$, and $D(y^i)$ for each process (S14).

According to the data analysis device 2 described above, influence of various factors in each process can be estimated on the basis of the line takt estimation model 4 with respect to variation in efficiency of the assembly line operation such as the performance deterioration of the manufacturing line 10, for example. This can facilitate to analyze variation in efficiency of an assembly line operation. Further, it is possible to improve analysis accuracy, processing efficiency, and the like with which a computer executes data analysis for an assembly line operation as described above.

In the present embodiment, the line takt estimation model 4 is configured to generate the effective takt distribution $D(t_1^i)$ by weighting the error stop distribution $D(s_j^i)$ and the defective time distribution $D(y^i)$ for each of the processes based on the absorption coefficient $\alpha_i$, which is a coefficient preset for each of the processes (See the equations (4) and (5)). According to this, it is possible to easily analyze variation in the efficiency of the assembly line operation such as performance deterioration in the manufacturing line 10 by reflecting a situation in which influence of a factor such as error stop of each process on performance deterioration of the manufacturing line 10 is alleviated by the work-in-process buffer 12 in the manufacturing line 10.

In the present embodiment, by using the fault threshold th determined from the effective takt distribution $D(t^1)$, the controller 20 is configured to detect the performance deterioration of the manufacturing line 10 based on the probability by which the effective takt distribution $D(t^1)$ allows to cause the efficiency of the assembly line operation in the history indicated by the facility log data D1 (S16). The controller 20 is configured to generate analysis information according to a detection result of the performance deterioration of the manufacturing line 10 (S17 to S20). By using the effective takt distribution $D(t^1)$ in consideration of influence of various factors, it is possible to detect performance deterioration of the manufacturing line 10 in distinction from normal low performance or the like. As described above, the variation in the efficiency of the assembly line operation can be easily analyzed.

In the present embodiment, instead of the variation factor distributions $D(s_j^i)$ and $D(y^i)$ for a specific factor such as a specific error or defective manufacturing in a certain process, by using the observation values $s_j^{i(V)}$ and $y^{i(V)}$ of the specific factor in the history indicated by the facility log data D1, the line takt estimation model 4 is configured to generate further effective takt distributions $D(t_1|s_j^{i(V)})$ and $(t_1|s_j^{i(V)})$ with observation of the specific factor (S18 and S19). The analysis information includes the influence degrees $I(s_j^{i(V)})$ and $I(y^{i(V)})$, which are examples of information evaluating the influence of the specific factor on the efficiency of the assembly line operation, according to a difference between the effective takt distributions $D(t_1|s_j^{i(V)})$ and $(t_1|s_j^{i(V)})$ with the observation of the specific factor and the effective takt distribution $D(t_1)$ without the specific factor. According to this, the influence of a specific factor in each process in fault of the manufacturing line 10 can be evaluated, and a cause of the fault of the manufacturing line 10 can be easily analyzed, for example.

In the present embodiment, the line takt estimation model 4 is configured to generate the effective takt distribution $D(t_1)$ of the manufacturing line 10, based on the ideal takt distribution $D(t_0)$ of the manufacturing line 10 (S14). The ideal takt distribution $D(t_0)$ of the manufacturing line 10 is a distribution of a maximum value in the ideal takt distribution $D(t_0^i)$ of each process, and efficiency is lowered more as the ideal takt $t_0^i$ is longer. Therefore, the ideal takt distribution $D(t_0)$ is an example of lowest efficiency distribution indicating probability distribution of lowest efficiency among corresponding efficiency of to the processes respectively. Accordingly, it is possible to easily analyze a variation in the efficiency of the assembly line operation in consideration of a situation in which a rate of maximum takt time, that is, minimum efficiency in each process is determined in the assembly line operation.

In the present embodiment, by using an observation value of the corresponding efficiency to a specific process such as the maximum ideal takt $t_0^{(V)}$ among corresponding efficiencies to the processes in the history indicated by the facility log data D1, instead of the ideal takt distribution $D(t_0)$ of the manufacturing line 10, the line takt estimation model 4 is configured to generate the effective takt distribution $D(t_1|t_0^{(V)})$ with observation of the efficiency of the specific process (S17). The analysis information includes the influence degree $I(t_0^{(V)})$, which is an example of information evaluating the influence of the corresponding efficiency to the specific process on efficiency of the assembly line operation, according to a difference between the effective takt distribution $D(t_1|t_0^{(V)})$ with the observation of the corresponding efficiency to the specific process and the effective takt distribution $D(t_1)$ without the observation of the corresponding efficiency to the specific process. Accordingly, the influence of the takt time or the like in a specific process in fault of the manufacturing line 10 can be evaluated, and a cause of the fault of the manufacturing line 10 can be easily analyzed; for example.

In the present embodiment, the assembly line operation is work to produce a manufactured product, which is an example of the article, in the manufacturing line 10, which is an example of the production line including a plurality of facilities for performing each process. The factors of each process include both an error stop of a facility for performing the process and occurrence of a defective product for the article. For example, in a situation where influence of one of the error stop or the occurrence of the defective product can be ignored, the above both factors may not be included in the factors of each process.

The data analysis device 2 according to the present embodiment further includes the memory 21 configured to store model data indicating the line takt estimation model 4. Based on the model data D2 stored in the memory 21, the controller 20 is configured to execute calculation to generate the effective takt distribution $D(t_1)$ as the line takt estimation model 4 (S13 and S14). The calculation of the line takt estimation model 4 can be executed to facilitate analysis of variation in efficiency of an assembly line operation.

In the present embodiment, the line takt estimation model 4 is constructed by Bayesian inference based on a past history of the assembly line operation operated in the past (S1 to S8). By Bayesian inference, various model parameters in the line takt estimation model 4 can be obtained as probability distribution, and various analyses can be easily performed.

The data analysis method in the present embodiment is a method for analyzing efficiency of an assembly line operation including a plurality of processes. The present method includes a step (S11) of acquiring the facility log data D1 indicating a history of the processed respectively performed for each time of the assembly line operation, and a step (S16 to S20) of generating analysis information indicating an analysis result of the history indicated by the facility log data D1, based on information generated by the line takt estimation model 4 to calculate probability distribution with respect to the assembly line operation. The line takt estimation model 4 generates process efficiency distribution indicating probability distribution of corresponding efficiency to each process in the assembly line operation and variation factor distribution indicating probability distribution of a factor in each process wherein the factor is probable to vary the efficiency of the assembly line operation (S13), and generates work efficiency distribution indicating probability distribution of the efficiency of the assembly line operation, based on process efficiency distribution and variation factor distribution (S14).

In the present embodiment, a program for causing a computer to execute the data analysis method as described above may be provided. According to the data analysis method of the present embodiment, it is possible to make it easy to analyze variation in efficiency of operating an assembly line operation in a plurality of processes.

Other Embodiments

As described above, the first embodiment is described as an example of the technique disclosed in the present application. However, the technique in the present disclosure is not limited to this, and is also applicable to an embodiment in which changes, replacements, additions, omissions, and the like are appropriately made. Further, the constituents described in each of the above-described embodiments can also be combined to form a new embodiment. In view of the above, other embodiments will be exemplified below.

In the first embodiment, the data analysis device 2 that performs both the data analysis operation and the model construction operation is described. In the present embodiment, the model construction operation may be performed by an information processing device outside the data analysis device 2, for example. For example, the data analysis device 2 of the present embodiment may acquire the model data D2 externally generated via the various I/F 24, 25, to perform the same data analysis operation as the operation in the above embodiment.

In the above embodiments, the operation example in which the calculation of the line takt estimation model 4 is executed in the data analysis device 2 is described. In the present embodiment, the calculation of the line takt estimation model 4 may be executed outside the data analysis device 2. For example, the data analysis device 2 of the present embodiment may transmit information to an external information processing device or the like having the line takt estimation model 4 via the various I/F 24, 25, and acquire information generated by the line takt estimation model 4 on the outside. Even in this case, the controller 20 of the data analysis device 2 can generate analysis information on the basis of the acquired information as in the above embodiments.

In the above embodiments, the factor evaluation list D5 is exemplified as an example of the analysis information, but the analysis information of the present embodiment is not limited to this. For example, the controller 20 of the data analysis device 2 may output various warnings when fault is detected in the data analysis operation of FIG. 9 (S16) as the analysis information, or may generate graph display as illustrated in FIGS. 4A and 4B.

In the above embodiments, an example of the line takt estimation model 4 is described. However, the line takt estimation model 4 in the present embodiment is not limited to this, and various changes may be made. For example, the line takt estimation model 4 in the present embodiment may be configured to be capable of inputting a facility number as a parameter of an explanatory variable additionally or alternatively to the structural parameters s and l. For example, a facility number for identifying a plurality of facilities included in different manufacturing lines 10 with a common process may be used for each process. Further, normal distribution, gamma distribution, and the like are used as distribution of the ideal takt and each factor, but the present disclosure is not limited to this. Distribution that is more appropriate should be selected based on actual distribution of the observation values. Further, in the line takt estimation model 4 in the present embodiment, the effective takt model 54 for each process may be omitted.

In the above embodiments, the data analysis device 2 analyzes fault in which production performance of the manufacturing line 10 is deteriorated, that is, lowering in efficiency of an assembly line operation. In the present embodiment, without limitation to fault of the manufacturing line 10, the data analysis device 2 may analyze a fine state in which the production performance is fine, and may analyze various variation including improvement in efficiency of an assembly line operation.

In the above embodiments, an example in which the data analysis device 2 and the data analysis method are applied to the manufacturing line 10 in the factory 1 is described. However, the present disclosure is not particularly limited to this, and various applications are possible. For example, the manufacturing line 10 to which the data analysis device and method of the present embodiment are applied is not limited to the one factory 1, and may be configured via a plurality of factories or the like.

The data analysis device and method of the present embodiment are not limited to the manufacturing line 10, and may be applied to a production line using a plurality of facilities in an assembly line operation including various processes. For example, a process in a production line is not limited to manufacturing, and may be various processes such as inspection and packaging. Even in such a case, stop of a facility or generation of a defective product may cause lowering in production performance. Therefore, also in the present embodiment, variation in efficiency of an assembly line operation can be easily analyzed by the data analysis method similar to the above.

Further, the data analysis device and method of the present embodiment can be applied to an assembly line operation using various facilities not limited to mechanical facilities in a factory. For example, an assembly line operation to be analyzed in the present embodiment may be delivery, data communication, or the like. A facility used for an assembly line operation may be a delivery vehicle, a communication facility, or the like. Further, the data analysis device and method according to the present embodiment can also be applied to various work performed manually, and not limited to an assembly line operation using a facility at all times. Even in this case, it is possible to analyze variation in efficiency of the assembly line operation on the basis of log data of a history of an assembly line operation as in the above embodiments.

As described above, the embodiment is described as an example of the technique in the present disclosure. For that purpose, the accompanying drawings and the detailed description are provided.

Accordingly, the constituents described in the accompanying drawings and the detailed description may include not only a constituent essential for solving the problem, but also a constituent not essential for solving the problem in order to exemplify the technique. For this reason, the non-essential constituents are not to be immediately recognized as essential just because the non-essential constituents are described in the accompanying drawings and the detailed description.

Further, since the above-described embodiment is for exemplifying the technique in the present disclosure, various changes, substitutions, additions, omissions, and the like can be made within the scope of claims or a scope equivalent to the claims.

INDUSTRIAL APPLICABILITY

The present disclosure is applicable to analysis of efficiency in operation of various assembly line operation s, and is applicable to e.g. analysis of production performance of an assembly line operation using a plurality of facilities in a production line.

The invention claimed is:

1. A data analysis device for analyzing efficiency of an assembly line operation including a plurality of processes, the data analysis device comprising:

an input interface configured to acquire log data indicating a history of the processes respectively performed for each time of the assembly line operation; and a control circuit configured to generate analysis information, based on information generated by a probability model to calculate probability distribution with respect to the assembly line operation, the analysis information indicating an analysis result of the history indicated by the log data, wherein the probability model is configured to:

generate process efficiency distribution and variation factor distribution, the process efficiency distribution indicating probability distribution of corresponding efficiency to each process in the assembly line operation, and the variation factor distribution indicating probability distribution of a factor in each process wherein the factor is probable to vary the efficiency of the assembly line operation; and generate work efficiency distribution, based on the process efficiency distribution and the variation factor distribution, the work efficiency distribution indicating probability distribution of the efficiency of the assembly line operation, wherein the control circuit is configured to generate the analysis information based on a difference between the work efficiency distribution and supplementary work efficiency distribution, and the supplementary work efficiency distribution is calculated by inputting observed efficiency or factor on at least one of the plurality of processes in the history indicated by the log data into the probability model as alternative of a corresponding part of the process efficiency distribution or the variation factor distribution.

2. The data analysis device according to claim 1, wherein the probability model is configured to generate the work efficiency distribution by weighting the variation factor distribution for each of the processes, based on a coefficient preset for each of the processes.

3. The data analysis device according to claim 1, wherein the control circuit is configured to:

detect efficiency variation based on probability by which the work efficiency distribution allows to cause the efficiency of the assembly line operation in the history indicated by the log data; and generate the analysis information according to a detection result of the efficiency variation.

4. The data analysis device according to claim 1, wherein the probability model is configured to generate the supplementary work efficiency distribution with observation of a specific factor, by using an observation value of the specific factor in the history indicated by the log data, instead of the variation factor distribution for the specific factor, and the analysis information includes information evaluating an influence of the factor on the efficiency of the assembly line operation according to the difference between the work efficiency distribution with the observation of the specific factor and the work efficiency distribution without the observation of the specific factor.

5. The data analysis device according to claim 1, wherein the probability model is configured to generate the work efficiency distribution, based on lowest efficiency distribution indicating probability distribution of lowest efficiency among corresponding efficiency to the plurality of processes respectively.

6. The data analysis device according to claim 5, wherein the probability model is configured to generate the supplementary work efficiency distribution with observation of corresponding efficiency to a specific process, by using an observation value of the corresponding efficiency to the specific process among the corresponding efficiency to the plurality of processes respectively in the history indicated by the log data, instead of the lowest efficiency distribution, and the analysis information includes information evaluating an influence of the corresponding efficiency to the specific process on the efficiency of the assembly line operation according to the difference between the work efficiency distribution with the observation of the corresponding efficiency to the specific process and the work efficiency distribution without the observation of the corresponding efficiency to the specific process.

7. The data analysis device according to claim 1, wherein the assembly line operation is work to produce an article in a production line including a plurality of facilities for performing the processes respectively, and the factor in each process includes at least one of an error stop of a facility for performing the process, or occurrence of a defective product for the article.

8. The data analysis device according to claim 1, further comprising a memory configured to store model data indicating the probability model,

wherein the control circuit is configured is to execute calculation as the probability model to generate the work efficiency distribution, based on the model data stored in the memory.

9. The data analysis device according to claim 1, wherein the probability model is constructed by Bayesian inference based on a past history of the assembly line operation.

10. A data analysis method for analyzing efficiency of an assembly line operation including a plurality of processes, the data analysis method comprising:

acquiring log data indicating a history of the processes respectively performed for each time of the assembly line operation; and generating analysis information, based on information generated by a probability model to calculate probability distribution with respect to the assembly line, the analysis information indicating an analysis result of the history indicated by the log data, wherein the probability model generates process efficiency distribution and variation factor distribution, the process efficiency distribution indicating probability distribution of corresponding efficiency to each process in the assembly line operation, and the variation factor distribution indicating probability distribution of a factor in each process wherein the factor is probable to vary the efficiency of the assembly line operation, and generates work efficiency distribution, based on the process efficiency distribution and the variation factor distribution, the work efficiency distribution indicating probability distribution of the efficiency of the assembly line operation, wherein the analysis information is generated based on a difference between the work efficiency distribution and supplementary work efficiency distribution, and the supplementary work efficiency distribution is calculated by inputting observed efficiency or factor on at least one of the plurality of processes in the history indicated by the log data into the probability model as alternative of a corresponding part of the process efficiency distribution or the variation factor distribution.

11. A non-transitory computer-readable recording medium storing a program for causing a computer to execute the data analysis method according to claim 10.

12. A data analysis device for analyzing efficiency of an assembly line operation including a plurality of processes, the data analysis device comprising:

an input interface configured to acquire log data indicating a history of the processes respectively performed for each time of the assembly line operation; and a control circuit configured to generate analysis information, based on information generated by a probability model to calculate probability distribution with respect to the assembly line operation, the analysis information indicating an analysis result of the history indicated by the log data, wherein the probability model is configured to:

generate process efficiency distribution and variation factor distribution, the process efficiency distribution indicating probability distribution of corresponding efficiency to each process in the assembly line operation, and the variation factor distribution indicating probability distribution of a factor in each process wherein the factor is probable to vary the efficiency of the assembly line operation; and generate work efficiency distribution, based on the
process efficiency distribution and the variation fac-
tor distribution, the work efficiency distribution indi-
cating probability distribution of the efficiency of the
assembly line operation, wherein the probability model is configured to generate further
work efficiency distribution with observation of a spe-
cific factor, by using an observation value of the
specific factor in the history indicated by the log data,
instead of the variation factor distribution for the spe-
cific factor, and the analysis information includes information evaluating
an influence of the factor on the efficiency of the
assembly line operation according to a difference
between the work efficiency distribution with the obser-
vation of the specific factor and the work efficiency
distribution without the observation of the specific
factor.

* * * * *